United States Patent
Al Jadda et al.

(10) Patent No.: US 12,026,677 B2
(45) Date of Patent: *Jul. 2, 2024

(54) INTERACTIVE JOB RECOMMENDATION AND APPLICATION SUBMISSION TOOLS OF EMPLOYMENT WEBSITE ENTITIES

(71) Applicant: CareerBuilder, LLC, Chicago, IL (US)

(72) Inventors: Khalifeh Al Jadda, Norcross, GA (US); Mohammed Korayem, Norcross, GA (US); Brandon Tripp, Norcross, GA (US); Amber Soley, Norcross, GA (US); Steve Proell, Norcross, GA (US)

(73) Assignee: CareerBuilder, LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/478,442

(22) Filed: Sep. 29, 2023

(65) Prior Publication Data
US 2024/0029028 A1 Jan. 25, 2024

Related U.S. Application Data

(63) Continuation of application No. 15/594,464, filed on May 12, 2017, now Pat. No. 11,775,934.
(Continued)

(51) Int. Cl.
*G06Q 10/1053* (2023.01)
*G06Q 10/10* (2023.01)

(52) U.S. Cl.
CPC ......... *G06Q 10/1053* (2013.01); *G06Q 10/10* (2013.01)

(58) Field of Classification Search
CPC ........................... G06Q 10/1053; G06Q 10/10
See application file for complete search history.

(56) References Cited

U.S. PATENT DOCUMENTS 8,195,657 B1 6/2012 Dellovo
9,406,103 B1 8/2016 Gray et al.
(Continued)

OTHER PUBLICATIONS

Outlook.uservoice.com, Outlook for iOS. Mark as Read when archiving or deleting email. Feb. 2, 2016-Apr. 30, 2016. Sep. 11, 2020 https://outlook.uservoice.com/forums/293349-outlook-for-ios/suggestions/8066526-mark-as-read-when-archiving-or-deleting-email?page=1&per_page=20 (year: 2016).
(Continued)

*Primary Examiner* — Andrew B Whitaker
*Assistant Examiner* — Shaun D Sensenig
(74) *Attorney, Agent, or Firm* — Neal, Gerber & Eisenberg LLP

(57) ABSTRACT

Methods and apparatus are disclosed for interactive job recommendation and application submission tools of employment website entities. A system includes processor (s). The processor(s) are configured to retrieve, during a session on an employment app operating on a computing device, a first employment opportunity for the candidate based upon candidate information and employment preferences of the candidate. The processor(s) are configured to detect, during the session, an employment command received from the candidate via the computing device in response to presenting the first employment opportunity to the candidate via the computing device. The processor(s), in response to determining that the employment command is a first predefined single swipe motion across a touchscreen of the computing device, are configured to automatically populate an electronic application for the first employment opportunity utilizing the candidate information, automatically submit the electronic application to an employer, and present a second employment opportunity via the computing device.

20 Claims, 9 Drawing Sheets

Related U.S. Application Data

(60) Provisional application No. 62/489,316, filed on Apr. 24, 2017.

(56) References Cited

U.S. PATENT DOCUMENTS

| | | |
|---|---|---|
| 2006/0149674 A1 | 7/2006 | Cook et al. |
| 2006/0229896 A1 | 10/2006 | Rosen et al. |
| 2006/0265258 A1 | 11/2006 | Powell et al. |
| 2007/0054248 A1 | 3/2007 | Bare |
| 2014/0207564 A1 | 7/2014 | Dubey et al. |
| 2014/0229342 A1 | 8/2014 | Marlowe et al. |
| 2015/0242942 A1 | 8/2015 | Viswanath et al. |
| 2016/0196534 A1 | 7/2016 | Jarrett et al. |
| 2016/0274711 A1 | 9/2016 | Qiu et al. |
| 2017/0102856 A1 | 4/2017 | Chakraborty |

OTHER PUBLICATIONS

Len, April. New Tinder Style Apps For Recruiting Talent. Web. archive.org. Mar. 12, 2015. [Retrieved on: Apr. 13, 2020]. Retrieved from internet: <URL: https://web.archive.org/web/20161227053354/https://www.crowdstaffing.com/blog/new-tinder-style-apps-for-recruiting-talent>. Entire document (Year: 2015).

Kanoff, Emily. Meet Switch—the Tinder of Job Search Apps. Stylecaster.com. 2015. [Retrieved on: Apr. 13, 2020]. Retrieved from internet: URL:https://stylecaster.com/switch-the-tinder-of-job-search-apps/. Entire document (Year: 2015).

INTERACTIVE JOB RECOMMENDATION AND APPLICATION SUBMISSION TOOLS OF EMPLOYMENT WEBSITE ENTITIES

CROSS REFERENCE TO RELATED APPLICATIONS

This application is a continuation of U.S. patent application Ser. No. 15/594,464, filed on May 12, 2017, which claims priority to U.S. Provisional Patent App. No. 62/489,316, filed on Apr. 24, 2017. The contents of these applications are incorporated herein by reference in their entireties.

TECHNICAL FIELD

The present disclosure generally relates to employment website entities and, more specifically, interactive job recommendation and application submission tools of employment web site entities.

BACKGROUND

Typically, employment websites (e.g., CareerBuilder.com®) are utilized by employers and job seekers. Oftentimes, an employment website incorporates a job board on which employers may post positions they are seeking to fill. In some instances, the job board enables an employer to include duties of a position and/or desired or required qualifications of job seekers for the position. Additionally, the employment website may enable a job seeker to search through positions posted on the job board. If the job seeker identifies a position of interest, the employment web site may provide an application to the job seeker for the job seeker to fill out and submit to the employer via the employment website.

An employment website may include thousands of job postings for a particular location and/or field of employment, thereby making it difficult for a job seeker to find positions of interest. Additionally, some job seekers may have difficulty identifying which of his or her qualifications (e.g., education, work experience, occupational licenses, etc.) are attractive to different employers. Furthermore, each employer with a job posting on an employment website typically requires a job seeker to submit an application for a position. In some instances, information required for an application for one position is at least partially the same information required for an application for another position. As a result, a job seeker may inefficiently spend time repeatedly identifying, generating, and submitting the same or similar information for applications for different positions. Thus, there is a need for a user-friendly computer interface that assists a job seeker in identifying jobs that are a good fit for the job seeker and in generating and submitting electronic applications for those jobs.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for interactive job recommendation and application submission tools of employment website entities. An example disclosed system for presenting employment opportunities and submitting applications includes a database configured to store employment preferences of a candidate and candidate information associated with a resume of the candidate. The example disclosed system includes one or more processors. The one or more processors are configured to retrieve, in real time during a session of the candidate on an employment app operating on a computing device, a first employment opportunity for the candidate based upon the candidate information and the employment preferences of the candidate. The one or more processors are configured to detect, during the session, an employment command received from the candidate via the computing device in response to presenting the first employment opportunity to the candidate via the computing device. The one or more processors, in response to determining that the employment command is a first predefined single swipe motion across a touchscreen of the computing device, are configured to automatically populate an electronic application for the first employment opportunity utilizing the candidate information, automatically submit the electronic application to an employer corresponding to the first employment opportunity, and present a second employment opportunity via the computing device.

An example disclosed method for presenting employment opportunities and submitting applications includes storing, via a database, employment preferences of a candidate and candidate information associated with a resume of the candidate. The example disclosed method includes retrieving, in real time during a session of the candidate on an employment app operating on a computing device, a first employment opportunity for the candidate based upon the candidate information and the employment preferences of the candidate. The example disclosed method includes detecting, during the session, an employment command received from the candidate via the computing device in response to presenting the first employment opportunity to the candidate via the computing device. The example disclosed method includes, in response to determining that the employment command is a first predefined single swipe motion across a touchscreen of the computing device, automatically populating an electronic application for the first employment opportunity utilizing the candidate information; automatically submitting the electronic application to an employer corresponding to the first employment opportunity; and presenting a second employment opportunity via the computing device.

An example disclosed tangible computer readable medium includes instructions which, when executed, cause a machine to store employment preferences of a candidate and candidate information associated with a resume of the candidate. The instructions which, when executed, also cause the machine to retrieve, in real time during a session of the candidate on an employment app operating on a computing device, a first employment opportunity for the candidate based upon the candidate information and the employment preferences of the candidate. The instructions which, when executed, also cause the machine to detect, during the session, an employment command received from the candidate via the computing device in response to presenting the first employment opportunity to the candidate via the computing device. The instructions which, when executed, also cause the machine to, in response to determining that the employment command is a first predefined single swipe motion across a touchscreen of the computing device, automatically populate an electronic application for the first employment opportunity utilizing the candidate information; automatically submit the electronic application to an employer corresponding to the first employment opportunity; and present a second employment opportunity via the computing device.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
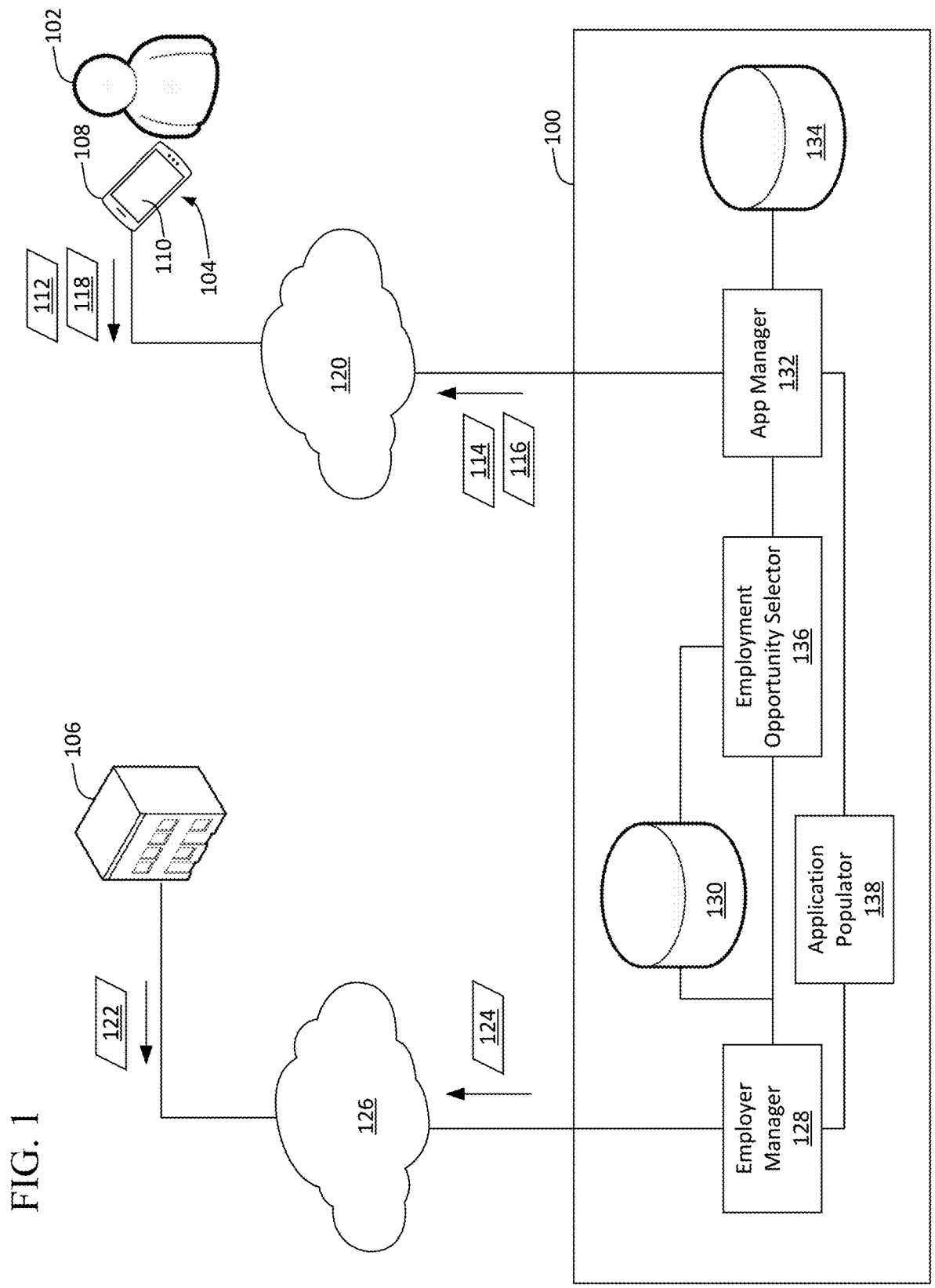
FIG. 1 illustrates an example employment website entity that presents employment opportunities and submits applications for a candidate via an employment app in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

The example methods and apparatus disclosed herein include an employment app that identifies candidate information from a resume of a job seeker, prompts the job seeker to provide employment preferences, identifies job opportunities for the job seeker based on the candidate information and the employment preferences, presents job opportunities to the job seeker one at a time, and automatically populates and submits an electronic application for a currently presented job opportunity for the job seeker responsive to the job seeker providing a predefined swipe motion associated with submitting an application. The examples disclosed herein automatically populate the electronic application of the job seeker for the job opportunity utilizing the candidate information of the job seeker's resume without requiring the job seeker to fill out the application. Thus, the examples disclosed herein provide an unconventional technical solution of automatically populating and submitting an electronic application for a job opportunity upon a job seeker providing a single predefined input motion to a technological problem of facilitating a job seeker in efficiently submitting applications via an employment application or app. Further, the employment app may enable the job seeker to identify a presented job opportunity as spam to facilitate the employment website in preventing subsequent presentation of the job opportunity to other job seekers. The employment app may also limit the number of job opportunities presented to the job seeker and/or the number of applications submitted for the job seeker within a predetermined time period to prevent the job seeker from inundating employers with applications.

Examples disclosed herein include an app manager that reviews a resume of a candidate, which includes candidate information, in real time during a session of the candidate on an employment app. In some examples, the app manager identifies the candidate based upon a username, an candidate name, and/or an email corresponding to the candidate. In some examples, the app manager identifies the candidate information in the resume that includes an education level, employment title(s), employment task(s), etc. of the candidate.

As used herein, a "candidate" and a "job seeker" refer to a person who is searching for a job, position, and/or career. As used herein, "candidate information" refers to contact information and/or qualification information of a candidate provided in a resume of the candidate. For example, candidate information includes a phone number, an email address, a street address, an education level, work experience, skills, occupational licenses, etc.

As used herein, a "session" refers to an interaction between a job seeker and an employment app. Typically, a session will be relatively continuous from a start point to an end point. For example, a session may begin when the candidate opens and/or logs onto the employment website and may end when the candidate closes and/of logs off of the employment website. As used herein, "real time" refers to a time period that is simultaneous to and/or immediately after a candidate enters a keyword into an employment website. For example, real time includes a time duration before a session of the candidate with an employment app ends.

As used herein, an "employment app," an "employment application," and an "employment bot" refer to a process of an employment website entity that is executed on a mobile device (e.g., a smart phone, a smart watch, a wearable, a tablet, etc.) and/or within a Internet browser of a candidate. As used herein, an "employment website entity" refers to an entity that operates and/or owns an employment website and/or an employment app. As used herein, an "employment website" refers to a website and/or any other online service that facilitates job placement, career, and/or hiring searches. Example employment websites include CareerBuilder.com®, Sologig.com®, etc.

During the session of the candidate on the employment app, the app manager of the examples disclosed herein also is to prompt the candidate, via a display, to provide one or more employment preferences and is to receive the one or more employment preferences, via an input screen, upon prompting the candidate via the display. In some examples, the app manager prompts the candidate to provide a first employment preference, receives the first employment preference from the candidate, subsequently prompts the candidate to provide a second employment preference, receives the second employment preference from the candidate, etc. In some examples, the app manager identifies preselected employment characteristics (e.g., a Chicago location, a Milwaukee location, a Grand Rapids location, etc.) based upon the candidate information included in the resume of the candidate, presents the preselected employment characteristics to the candidate as selectable buttons (e.g., electronic buttons) via the display, and receives a selection of one or more of the preselected employment characteristics as one or more of the employment preferences. Further in some examples, the app manager compares the employment preferences to the candidate information of the resume and presents a warning to the candidate, via the display, if at least one of the employment preferences does not correspond to the candidate information of the resume.

As used herein, an "employment preference" refers to a characteristic of an employment opportunity that is of interest to a candidate. For example, employment preferences include an employment or job title, a region or location of employment, an employment type, an income level, etc. As used herein, an "input screen" includes a screen, such as a touch screen, that receives input from a candidate. For example, a touch screen includes the display and the input screen.

Examples disclosed herein also include an employment opportunity selector that retrieves, during the session, an employment opportunity (e.g., a first employment opportunity) from a job database based upon employment search parameters of the candidate that includes, for example, the candidate information and search history of a candidate profile of the candidate. For example, the job database stores employment opportunities submitted to the employment website entity by recruiters and/or employers that are to be presented to one or more candidates.

As used herein, an "employment opportunity," a "job opportunity," and a "job posting" is information representing a position for which a recruiter and/or an employer is hiring that is to be presented to one or more candidates (e.g., via an employment app). As used herein, a "recruiter" refers to a person and/or entity (e.g., an employer such as a company, a corporation, etc.) that is soliciting and/or looking to hire one or more candidates for a position and/or a job. As used herein, an "employer" refers to a person and/or entity that employs one or more people for position(s) and/or job(s).

As used herein, an "employment search parameter" refers to search parameters associated with a candidate that are utilized to identify employment opportunities to be presented to the candidate via an employment app. Example search parameters include candidate information obtained from a resume, employment preference(s) received upon prompting the candidate, historical data of candidate activities on the employment app, etc.

Further, in some examples, the app manager and/or the employment opportunity selector transforms words and/or phrases of employment search parameters obtained via the candidate's resume and/or provided by the candidate to enable or facilitate the employment opportunity selector in retrieving employment opportunities from the job database. As used herein, to "transform," to "stem," and to "perform word normalization" refer to processes in which a word and/or one or more words of a phrase may be changed to its word stem, root, or base. For example, each of the words "performs," "performed," and/or "performing" might be transformed to "perform."

During the session and upon the employment opportunity selector retrieving the employment opportunity, the app manager presents, via the display, the employment opportunity and detects, via the input screen, an employment command from the candidate. As used herein, an "employment command" refers to an input provided by a candidate to instruct the employment app to perform an action on behalf of the candidate related to an employment opportunity presented to the candidate.

Examples disclosed herein also include an application populator that automatically populates an electronic application for the employment opportunity presented to the candidate (e.g., the first employment opportunity) utilizing the candidate information included in the candidate's resume in response to determining that the employment command is a predefined input motion (e.g., a first predefined input motion) associated with populating an application. In some examples, the app manager modifies the employment search parameters, a candidate profile, and/or search history to present more or less employment opportunities that have shared characteristics with the first employment opportunity based upon the employment command provided by the candidate. In doing so, the App uses semantic analysis to improve its selection criterion for a given candidate based on the candidate's prior responses to the App.

In some examples, the application populator determines whether the entire application is able to be populated based upon the candidate information. That is, the application populator determines whether the candidate information of the resume includes all of the requested information of the application. In such examples, if the application populator determines that the entire application is unable to be populated based upon the candidate information, the app manager prompts for and receives additional information from the candidate that is requested in the application. This may involve, for example, a response intended to be explanatory in nature. In such cases, the app will present the question or scenario to the candidate and will populate the candidate's response.

As used herein, to "populate" refers to a process in which information that an employer requests of a candidate for an application is obtained and provided to complete or fill in the application. In some examples, the predefined input motion is a single swipe motion (e.g., a first swipe motion) in a direction (e.g., a first direction) across the input screen. For example, upon detection of a single swipe motion, an application may be populated via an employment app utilizing candidate information of a candidate and submitted to a corresponding employer via the employment app on behalf of the candidate.

As used herein, a "swipe motion," a "swipe gesture," and a "swipe" refer to a continuous input motion in which a conductive object, such as a human finger, is pressed against and dragged in a direction across a surface capacitive input screen. As used herein, a "single swipe motion" refers to a swipe motion that extends substantially in one direction (e.g., rightward, upward, leftward, downward) along the entirety of the swipe motion. A single swipe motion may extend in a direction linearly or in an arced manner. For example, the first predefined input motion associated with populating an application is a single swipe motion in a rightward direction. In some examples in which the input screen is a touch screen, a swipe motion includes a continuous motion in which a user touches the touch screen and drags his or her finger in a direction across the touch screen. In some examples in which the input screen is not a touch screen, a swipe motion includes a continuous motion in which a user selects an object via curser and subsequently moves the curser in a direction across the touch screen.

In some examples, the app manager saves the employment opportunity for the candidate in response to determining that the employment command is a second predefined input motion (e.g., a second swipe motion across the input screen in a second direction). In such examples, the app manager saves the employment opportunity (e.g., in a candidate database) to enable the candidate to access, populate, and submit an application for the employment opportunity at a later time. Further, in some example, the app manager skips the employment opportunity in response to determining that the employment command is a third predefined input motion (e.g., a third swipe motion across the input screen in a third direction). The app manager skips the employment opportunity by not populating and submitting an application for the employment opportunity on behalf of the candidate. Additionally or alternatively, the app manager flags the employment opportunity as spam in response to determining that the employment command is a fourth predefined input motion (e.g., a fourth swipe motion across the input screen in a fourth direction). To flag the employment opportunity as spam, the app manager identifies the employment opportunity as a fraudulent employment opportunity and causes the employment opportunity to be removed from a job database. As used herein, "spam" refers to information that is not an employment opportunity but is submitted by a third party to the employment website entity in the form of an employment opportunity submission.

Examples disclosed herein also include an employer manager that automatically submits the electronic application populated by the application populator to an employer corresponding to the employment opportunity. That is, the employer manager submits the completed application to the employer that submitted the employment opportunity.

In some examples, the app manager presents another employment opportunity (e.g., a second employment opportunity) in response to receiving the employment command for the previous employment opportunity (e.g., the first employment opportunity). Further, in some examples, the app manager limits a number of employment opportunities presented to the candidate via the display in a predetermined time period (e.g., a first predetermined time period).

To limit the number of employment opportunities presented to, and/or the number of applications subsequently submitted on behalf of, the candidate, the app manager monitors the number of employment opportunities presented to the candidate in the first predetermined time period and stops presenting employment opportunities to the candidate for a subsequent predetermined time period (e.g., a second predetermined time period) if the number of employment opportunities presented during the first predetermined time period is greater than a first threshold. Additionally or alternatively, the app manager stops presenting employment opportunities to the candidate for a predetermined time period (e.g., a fourth predetermined time period) upon the app manager presenting a predetermined number of employment opportunities during the first predetermined time period and/or the employer manager submitting a predetermined number of applications for the candidate in a previous predetermined time period (e.g., a third predetermined time period) to cap the number of application submitted on behalf of the candidate.

Further, in some examples, when the employer manager receives a new employment opportunity from an employer (e.g., while a candidate's session with the employment app is not underway (e.g., before or after a session), during a candidate's session with the employment app) that shares characteristics "learned" by the employer manager to be of interest to the candidate based on prior inputs from the candidate, the employer manager triggers an alert to the candidate. More specifically, upon receipt of a new employment opportunity, the app manager determines whether the new employment opportunity corresponds to a candidate profile of the candidate and presents the new employment opportunity and/or an alert for the new employment opportunity to the candidate via the display (e.g., during an ongoing session or upon starting a new session) in response to determining that the new employment opportunity corresponds to the candidate profile.

Turning to the figures, FIG. 1 illustrates an example employment website entity 100 (e.g., CareerBuilder.com®) that presents employment opportunities and submits applications for a candidate 102 via an employment app 104 in accordance with the teachings herein. As illustrated in FIG. 1, the employment website entity 100 is in communication with the candidate 102 and an employer 106.

In the illustrated example, the candidate 102 utilizes a mobile device 108 (e.g., a smart phone, a tablet, a wearable a smart watch, a laptop, etc.) and/or any other type of computer to interact with the employment app 104 of the employment website entity 100. The candidate 102 interacts with the employment app 104 during a session of the candidate 102 on the employment app 104. For example, the employment app 104 presents information (e.g., prompts, employment opportunities, descriptions of employment opportunities, requirements for employment opportunities, descriptions of employers, etc.) to the candidate via a display 110 of the mobile device 108. In the illustrated example, the display 110 is a touch screen. In such examples, the display 110 is an input screen that enables the candidate 102 to provide input command(s) and/or information by touching the display 110.

For example, the candidate 102 submits or provides candidate data 112 to the employment website entity 100 via the employment app 104. In some examples, the candidate data 112 includes a candidate profile of the candidate 102 and/or document(s) associated with the candidate 102 (e.g., a resume, a cover letter). The resume, other document(s), and/or the candidate profile includes candidate information of the candidate 102, such as contact information (e.g., a street address, an email address, a phone number, etc.), education level, attended school(s), previous employment title(s), previous place(s) of employment, performed employment task(s), skill(s), license(s), certificate(s), membership(s), etc. In some examples, the candidate data 112 includes employment preferences for the candidate 102, such as preferred employment title(s) (e.g., UX designer, software engineer, server, etc.), location(s) or region(s) of employment (e.g., a city, a state, an area code, etc.), industry(s) of interest (e.g., oil and gas, automotive, food services, etc.), employment type(s) (e.g., full-time, part-time, contract, seasonal, internship, etc.), income level(s), etc.

The employment website entity 100 sends one or more prompts 114 to the mobile device 108 and/or another computer of the candidate 102. For example, the display 110 of the mobile device 108 presents the prompts 114, via the employment app 104, to prompt the candidate 102 in providing at least a portion of the candidate data 112 to the employment website entity 100. For example, the employment website entity 100 sends the prompts 114 to the candidate 102 via the employment app 104 to prompt the candidate 102 to provide a resume, other document(s), candidate information, and/or employment preferences.

The employment website entity 100 also sends employment opportunity data 116 to the mobile device 108. The display 110 of the mobile device 108 presents the employment opportunity data 116 to the candidate 102 via the employment app 104. The employment opportunity data 116 includes information for one or more employment opportunities (e.g., a title, a location, an industry, an employment type, an income level, etc.) to facilitate the candidate in determining whether to submit corresponding application(s).

Additionally, the candidate 102 submits, provides, and/or otherwise sends one or more employment command data 118 to the employment website entity 100 via the employment app 104. The employment command data 118 instructs the employment app 104 on whether to submit applications for employment opportunities presented to the candidate 102 via the employment app 104. For example, employment command data 118 may include an employment command associated with a first predefined input motion that instructs the employment website entity 100 to automatically populate and submit an electronic application for a presented employment opportunity on behalf of the candidate 102, an employment command associated with a second predefined input motion that instructs the employment website entity 100 to save a presented employment opportunity for the candidate 102, an employment command associated with a third predefined input motion that instructs the employment website entity 100 to skip a presented employment opportunity, and/or an employment command associated with a fourth predefined input motion that instructs the employment website entity 100 to flag a presented employment opportunity as spam.

In the illustrated example, the candidate data 112 and the employment command data 118 provided by the candidate 102 is sent to a network 120 (e.g., via a wired and/or a wireless connection). While FIG. 1 depicts the network 120 receiving candidate data and employment command data from one candidate (e.g., the candidate data 112 and the employment command data 118 of the candidate 102), the network 120 may receive candidate data and/or employment command data from a plurality of candidates (e.g., a second candidate, a third candidate, etc.). Further, as illustrated in FIG. 1, the employment website entity 100 collects the candidate data 112 and the employment command data 118 from the network 120 (e.g., via a wired and/or wireless connection). Additionally, the employment website entity 100 sends the prompts 114 and the employment opportunity data 116 to the candidate 102 via the network 120. While FIG. 1 depicts the network 120 providing prompts and employment opportunity data to one candidate, the network 120 may provide prompts and employment opportunity data to a plurality of candidates (e.g., a second candidate, a third candidate, etc.).

The employer 106 of the illustrated example is a company, a corporation, and/or another entity that is utilizing the employment app 104 of the employment website entity 100 to hire a candidate (e.g., the candidate 102) for an employment opportunity (e.g., an open position). While the illustrated example includes one employer (e.g., the employer 106) in communication with the employment website entity 100, a plurality of employer may be in communication with the employment website entity 100 to hire candidates utilizing the employment app 104. Additionally or alternatively, one or more recruiters may be in communication with the employment website entity 100 to hire candidates utilizing the employment app 104 on behalf of employers.

As illustrated in FIG. 1, the employer 106 provides employer data 122 to the employment website entity 100. For example, the employer data 122 includes employer information, such as a company name, a number of employees, field(s) of industry, office location(s), years of business, etc. The employer data 122 also includes information regarding an employment opportunity for which the employer 106 is looking to hire. For example, the employment opportunity information (e.g., employment opportunity information 804 of FIG. 8, employment opportunity information 1002 of FIG. 10) includes an employment title, a location or region of employment, an industry, an employment type, expected tasks, preferred or required years of experience, education level(s), certificate(s), license(s), etc. Additionally, the employer 106 of the illustrated example receives applicant data 124 from the employment website entity 100. For example, the applicant data 124 includes one or more applications, resumes, contact, information etc. that were submitted by candidate(s) (e.g., the candidate 102) via the employment app 104 and/or an employment entity website of the employment website entity 100. As illustrated in FIG. 1, the employer 106 sends the employer data 122 to the employment website entity 100 via a network 126 (e.g., via a wired and/or a wireless connection), and the employment website entity 100 sends the applicant data 124 to the employer 106 via the network 126 (e.g., via a wired and/or a wireless connection).

The employment website entity 100 of the illustrated example includes an employer manager 128, a job database 130, an app manager 132, a candidate database 134, an employment opportunity selector 136, and an application populator 138. The employer manager 128 receives the employer data 122 from the employer 106 and/or other employer(s), adds employment opportunity entries to the job database 130 based upon the employer data 122, and provides the applicant data 124 to the employer 106 and/or other employer(s). The job database 130 stores data associated with employment opportunities for which the employer 106 and/or other employer(s) are looking to hire. The app manager 132 receives the candidate data 112 and the employment command data 118 from the candidate 102 and/or other candidate(s), adds candidate information to the candidate database 134 based upon the candidate data 112, and sends the prompts 114 and the employment opportunity data 116 to the candidate 102 and/or other candidate(s). The employment opportunity selector 136 selects (e.g., based upon the candidate data 112 and the employer data 122) and retrieves information on an employment opportunity that is to be presented to the candidate 102 and/or other candidate(s). Additionally, the application populator 138 populates application(s) for the candidate 102 and/or other candidate(s) upon the app manager 132 receiving corresponding employment command(s).

In operation, the employer manager 128 collects the employer data 122 and adds information regarding employment opportunities for which employers (e.g., the employer 106) are looking to hire into the job database 130. The job database 130 stores the information related to those employment opportunities. The app manager 132 sends the prompts 114 to and collects the candidate data 112 from candidates (e.g., the candidate 102) that are utilizing the employment app 104 to find employment opportunities. Further, the app manager 132 adds the candidate data 112 to the candidate database 134. The candidate database 134 stores the candidate data 112 and/or other data related to the candidates (e.g., employment opportunities saved by the candidates). The app manager 132 causes the employment opportunity selector 136 to select an employment opportunity stored in the job database 130 based on the candidate data 112 corresponding to the candidate 102 that is stored in the candidate database 134. The app manager 132 sends the employment opportunity data 116 corresponding to the employment opportunity selected by the employment opportunity selector 136 to the mobile device 108 of the candidate 102 to present the employment opportunity to the candidate 102 through the employment app 104. The app manager 132 receives the employment command data 118 from the candidate 102 and causes employment opportunity task(s) to be performed based upon the employment command data 118. For example, when the employment command data 118 received from the candidate 102 corresponds to instruction(s) to submit an application for an employment opportunity, the app manager 132 causes the application populator 138 to automatically populate and the employer manager 128 to automatically submit the electronic application for the candidate 102.

Figure 2:
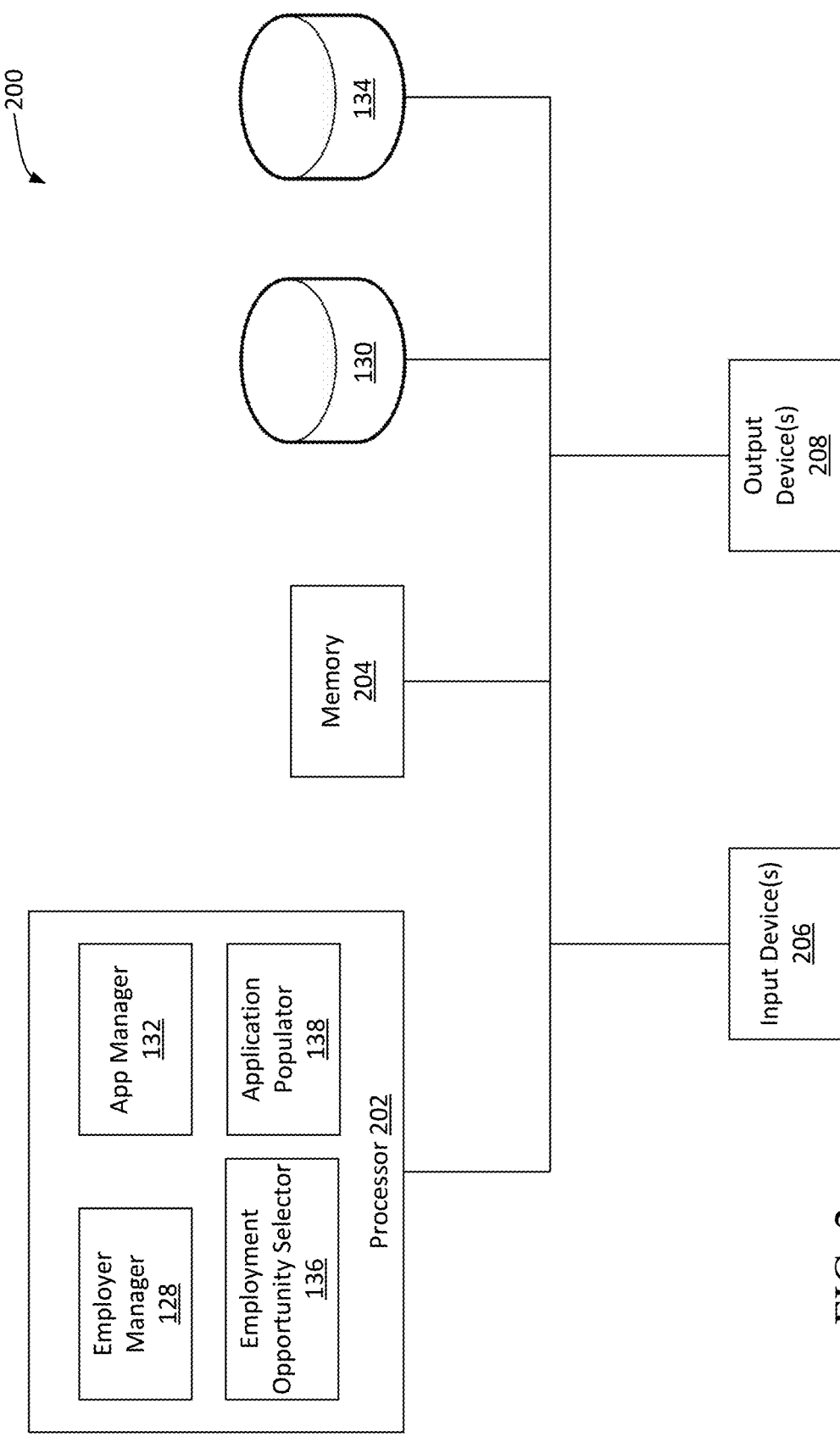
FIG. 2 is a block diagram of electronic components of the employment web site entity of FIG. 1.

FIG. 2 is a block diagram of electronic components 200 of the employment website entity 100. As illustrated in FIG. 2, the electronic components 200 include a microcontroller unit, controller or processor 202. Further, the electronic components 200 include memory 204, the job database 130, the candidate database 134, input device(s) 206, and output device(s) 208.

In the illustrated example, the processor 202 is structured to include the employer manager 128, the app manager 132, the employment opportunity selector 136, and the application populator 138. The processor 202 of the illustrated example is any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). In some examples, the memory 204 is volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). Further, in some examples, the memory 204 includes multiple kinds of memory, particularly volatile memory and non-volatile memory.

The memory 204 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 204, the computer readable medium, and/or within the processor 202 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In the illustrated example, the input device(s) 206 enable a user, such as an information technician of the employment website entity 100, to provide instructions, commands, and/or data to the processor 202. Examples of the input device(s) 206 include one or more of a button, a control knob, an instrument panel, a touch screen, a touchpad, a keyboard, a mouse, a speech recognition system, etc.

The output device(s) 208 of the illustrated example display output information and/or data of the processor 202 to a user, such as an information technician of the employment website entity 100. Examples of the output device(s) 208 include a liquid crystal display (LCD), an organic light emitting diode (OLED) display, a flat panel display, a solid state display, and/or any other device that visually presents information to a user. Additionally or alternatively, the output device(s) 208 may include one or more speakers and/or any other device(s) that provide audio signals for a user. Further, the output device(s) 208 may provide other types of output information, such as haptic signals.

FIG. 3-10 depict user interfaces of the employment app 104 that are presented by the app manager 132 to the candidate 102, for example, via the display 110 of the mobile device 108 as the candidate 102 interacts with the employment app 104.

Figure 3:
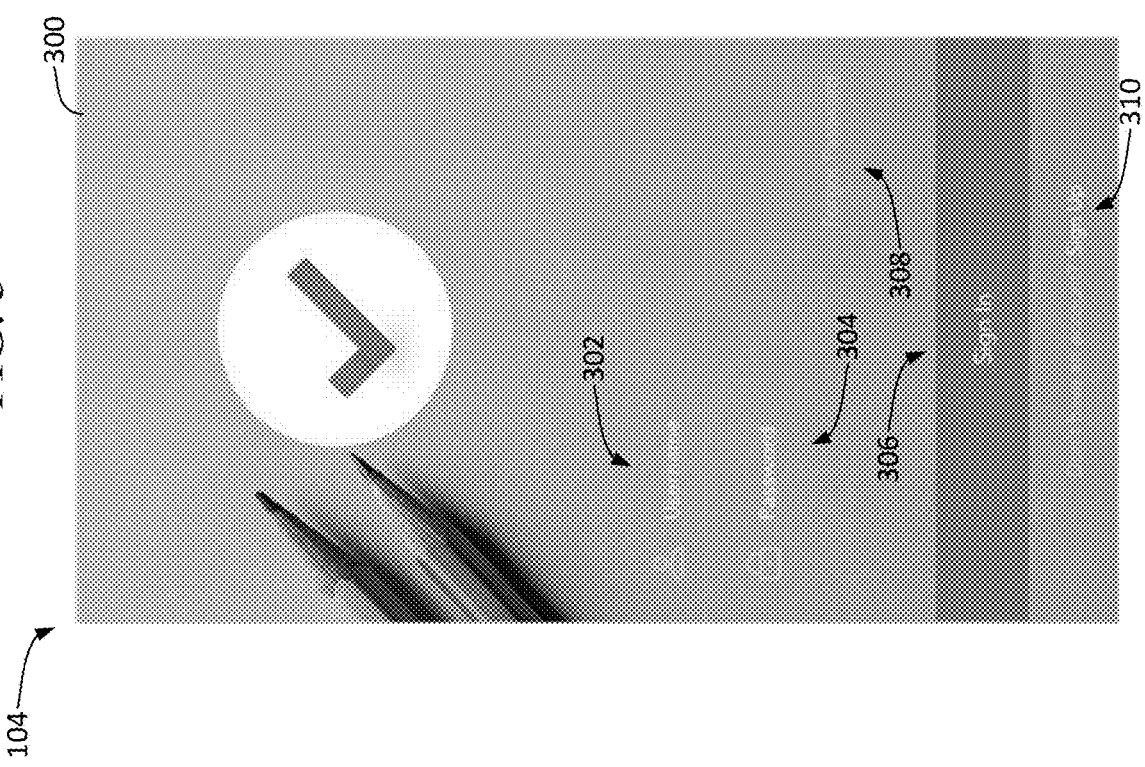
FIG. 3 illustrates an example interface of the employment app presented to the candidate of FIG. 1.

For example, FIG. 3 illustrates an example interface 300 of the employment app 104 that is initially presented to the candidate 102. The interface 300 includes a username textbox 302, a password textbox 304, and a sign-in button 306. To start a session of the candidate 102 on the employment app 104, the candidate 102 is to enter a username designated for the candidate 102 into the username textbox 302, enter a corresponding password into the password textbox 304, and select the sign-in button 206. For example, the username designated for the candidate 102 may be a username specific to the employment app 104, an email address of the candidate 102 that is registered with the employment website entity 100, a name of the candidate 102, and/or any other word or phrase to identify the candidate 102. If the candidate 102 has forgotten his or her password, the candidate 102 may select a forgot-password button 308 that prompts the employment website entity 100 to send an email including a temporary password to an email address of the candidate 102 that is registered with the employment website entity 100. Additionally, the interface 300 includes a sign-up button 310 that facilitates a new user to create an account with the employment website entity 100.

Figure 4:
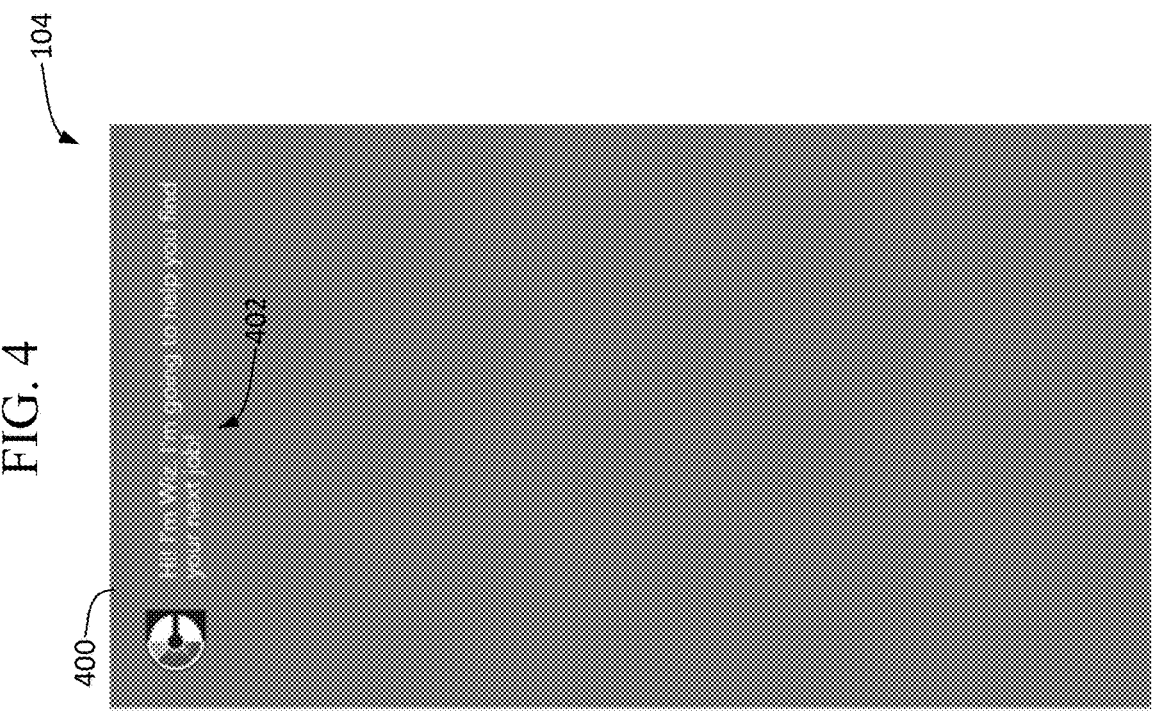
FIG. 4 illustrates another example interface of the employment app presented to the candidate of FIG. 1.

FIG. 4 illustrates another example interface 400 of the employment app 104 that is presented to the candidate 102 by the app manager 132. The interface 400 includes a notification 402 (e.g., a first notification) that informs the candidate 102 that the employment app 104 is to facilitate the candidate 102 in finding employment opportunities.

Figure 5:
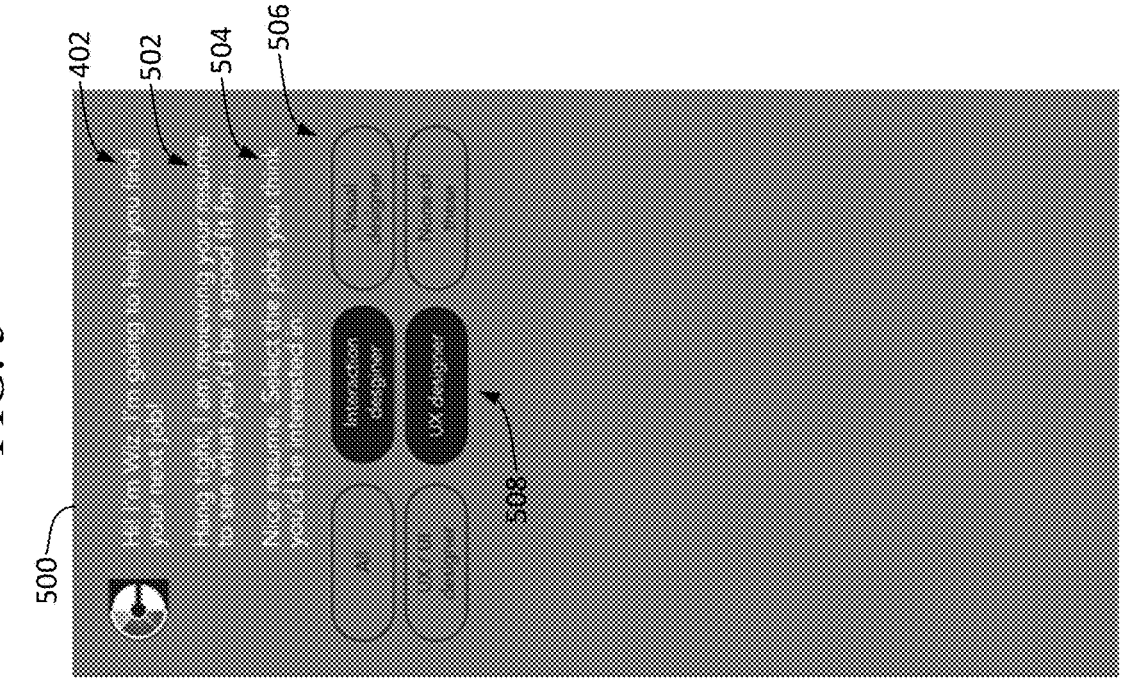
FIG. 5 illustrates another example interface of the employment app presented to the candidate of FIG. 1.

FIG. 5 illustrates another example interface 500 of the employment app 104 that is presented to the candidate 102 by the app manager 132. As illustrated in FIG. 5, the interface 500 includes a notification 502 (e.g., a second notification) below the notification 402 informing the candidate 102 that his or her resume has been identified and is being reviewed (e.g., by the app manager) in real time during the session of the candidate 102 on the employment app 104. In other examples in which the employment website entity 100 does not have a resume corresponding to the candidate 102, the interface 500 may include a prompt to prompt the candidate 102 to submit a resume via the employment app 104. For example, the resume is reviewed to identify potential employment titles of interest. After the resume of the candidate 102 is reviewed, a prompt 504 (e.g., a first prompt) is subsequently included in the interface 500 to prompt the candidate 102 to provide one or more employment areas of interest. In the illustrated example, the interface 500 also includes preselected employment characteristics (e.g., related to job titles) that are identified by the app manager 132 based upon the qualifications of the candidate 102. For example, the interface 500 includes job-title buttons 506 (e.g., a first set of selectable buttons) that are selected, at least in part, based upon candidate information identified upon reviewing the resume of the candidate 102. In the illustrated example, the job-title buttons 506 include an "all" button, an "interaction designer" button, a "visual designer" button, a "UX/UI designer" button, a "UX designer" button, and a "none of these" button. Presentation of the job-title buttons 506 and/or other buttons corresponding to other preselected employment characteristics of the employment app 104 help solve the technical problem of matching job seekers with employers by preventing the candidate 102 from being overwhelmed with employment opportunities having characteristics that don't fit his or her qualifications and/or by preventing the employer 106 from receiving resumes from job seekers that aren't qualified for its position.

The candidate 102 selects one or more of the job-title buttons 506, in real time during his or her session on the employment app 104, to provide employment preferences by identifying which employment titles are of interest to the candidate 102. In the illustrated example, the candidate 102 has selected the "interaction designer" button and the "UX designer" button to indicate that he or she is interested in employment positions for an interaction designer and a UX designer. Further, the candidate 102 may select the "all" button to select all of the job-title buttons 506 corresponding to an employment title or may select the "none of these" button to deselect each of the job-title buttons 506 corresponding to an employment title. For example, selection of the "none of these" button causes the employment opportunities that are subsequently selected by the employment opportunity selector 136 for presentation to the candidate 102 to have characteristics that are different than those corresponding to the other job-title buttons 506. In examples in which the display 110 of the mobile device 108 is a touch screen, the candidate 102 selects one or more of the job-title buttons 506 by touching corresponding portion(s) of the display 110. Additionally or alternatively, the candidate 102 may provide audible instructions (e.g., via a microphone and speech-recognition software) to select one or more of the job-title buttons 506. In the illustrated example, the interface 500 also includes a selection 508 (e.g., a first selection) that identifies which of the job-title buttons 506 have been selected (e.g., the "interaction design" button and the "UX designer" button) by highlighting those of the job-title buttons 506 that have been selected by the candidate 102.

In some examples, the selection 508 and/or other selection(s) of the employment preference(s) (e.g., a selection 614 of FIG. 6, a selection 706 of FIG. 7) is compared to the candidate information of the resume of the candidate 102. If a selection of an employment preference (e.g., a first employment preference) is identified as not corresponding to the candidate information (e.g., selection for a position as a CEO when the candidate information indicates the candidate 102 is a college student), the interface 500 and/or another interface may include a warning to the candidate 102 that the selection does not fit with the candidate information. Further, in some examples, the employment app 104 may prevent the candidate 102 from selecting an employment preference that does not correspond with the candidate information to prevent the selection from affecting which employment opportunities will be subsequently presented to the candidate 102.

Thus, comparison of the selection(s) and the candidate information by the application helps solve a technical problem of existing electronic job matching software solutions by preventing the candidate from being overwhelmed with employment opportunities having characteristics that don't fit his or her qualifications and/or by preventing the employer 106 from receiving resumes from job seekers that aren't qualified for its position.

Figure 6:
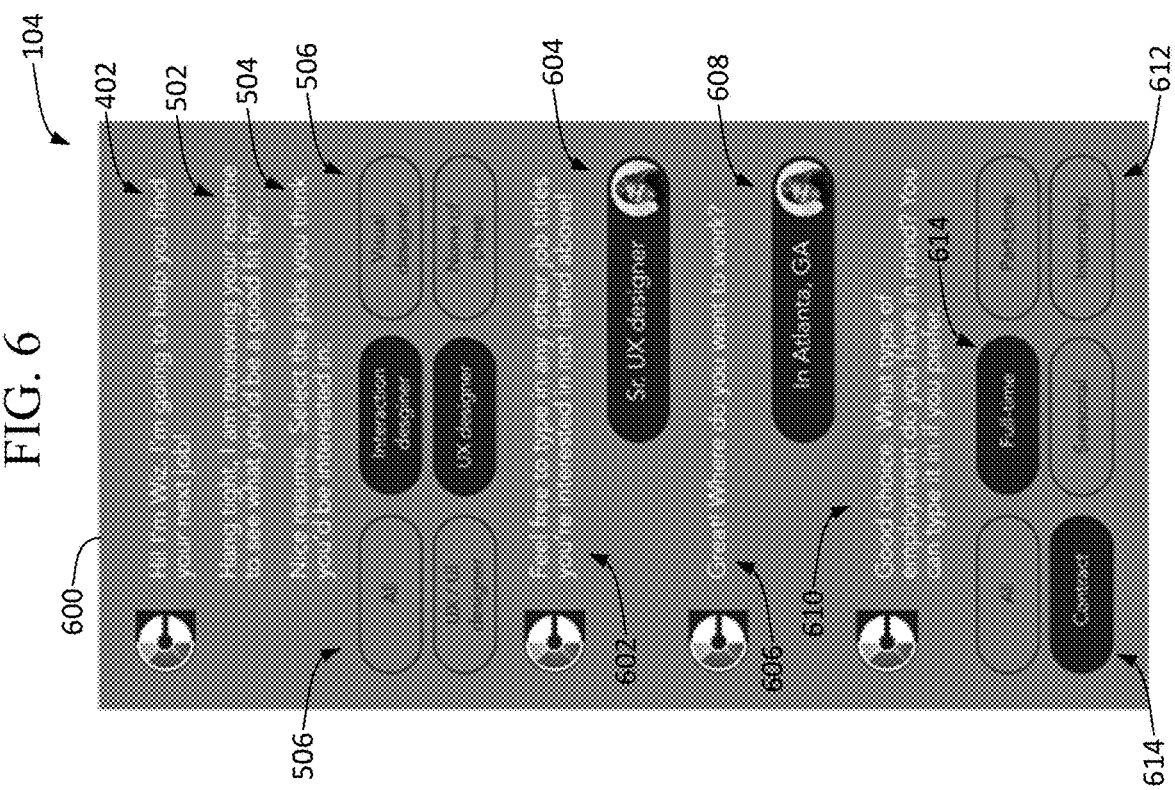
FIG. 6 illustrates another example interface of the employment app presented to the candidate of FIG. 1.

FIG. 6 illustrates another example interface 600 of the employment app 104 that is presented to the candidate 102 by the app manager 132. As illustrated in FIG. 6, the interface 600 includes another prompt 602 (e.g., a second prompt) below the notification 402, the notification 502, the prompt 504, and the job-title buttons 506. The prompt 602 prompts the candidate 102 to identify any other employment title(s) of interest. The interface 600 also includes a response 604 (e.g., a first response) that the candidate 102 provides in response to the prompt 602 to identify additional employment preference(s) related to an employment title. In the illustrated example, the response 604 identifies that the candidate is interested in employment opportunities related a "Sr. UX Designer" employment title. The candidate 102 may provide the response 604 textually (e.g., via buttons) and/or audibly (e.g., via a microphone and speech-recognition software).

The interface 600 of the illustrated example includes another prompt 606 (e.g., a third prompt) that prompts the candidate 102 to provide a employment location of interest and a corresponding response 608 (e.g., a second response) of the candidate 102 that identifies employment preference(s) related to employment location(s) of interest (e.g., a city, a state, a country, a geographic region). In the illustrated example, the response 608 of the candidate 102 identifies a city (e.g., "Atlanta") and a state (e.g., "GA" or Georgia). For example, the candidate 102 provides the response 608 textually and/or audibly. In other examples, the interface 600 may include buttons corresponding to various potential employment locations of interest that the candidate 102 is to select.

In some examples, the response 604, the response 608 and/or other response(s) for employment preference(s) are compared to the candidate information of the resume of the candidate 102. If a response for an employment preference is identified as not corresponding to the candidate information, the interface 600 and/or another interface may include a warning to the candidate 102 that the response does not fit with the candidate information. Further, in some examples, the employment app 104 may prevent the candidate 102 from accepting a response that does not correspond with the candidate information to prevent the selection from affecting which employment opportunities will be subsequently presented to the candidate. Thus, comparison of the response(s) and the candidate information helps solve the technical problem of matching job seekers with employers by preventing the candidate 102 from being overwhelmed with employment opportunities having characteristics that don't fit his or her qualifications and/or by preventing the employer 106 from receiving resumes from job seekers that aren't qualified for its position.

The interface 600 of the illustrated example also includes another prompt 610 (e.g., a fourth prompt) that prompts the candidate 102 to provide one or more employment types of interest. Additionally, the interface 600 includes job-type buttons 612 (e.g., a second set of selectable buttons) that enable the candidate to identify employment type(s) of interest. For example, the job-type buttons 612 include an "all" button, a "full-time" button, a "part-time" button, a "contract" button, a "seasonal" button, and an "internship" button. The candidate 102 selects one or more of the job-type buttons 612 to provide employment preferences related to employment types. In the illustrated example, the candidate 102 has selected the "full-time" button and the "contract" button to indicate that he or she is interested in full-time work and/or contract work. Further, the candidate 102 may select the "all" button to select all of the job-type buttons 612 corresponding to an employment type. The interface 500 of the illustrated example also includes a selection 614 (e.g., a second selection) that identifies which of the job-type buttons 612 have been selected (e.g., the "full-time" button and the "contract" button) by highlighting those of the job-type buttons 612 that have been selected by the candidate 102. In other examples, the interface 600 enables the candidate 102 to provide (e.g., via text and/or audible instructions) an employment type preference via the employment app 104 without displaying and facilitating selection of dedicated job-type buttons.

Figure 7:
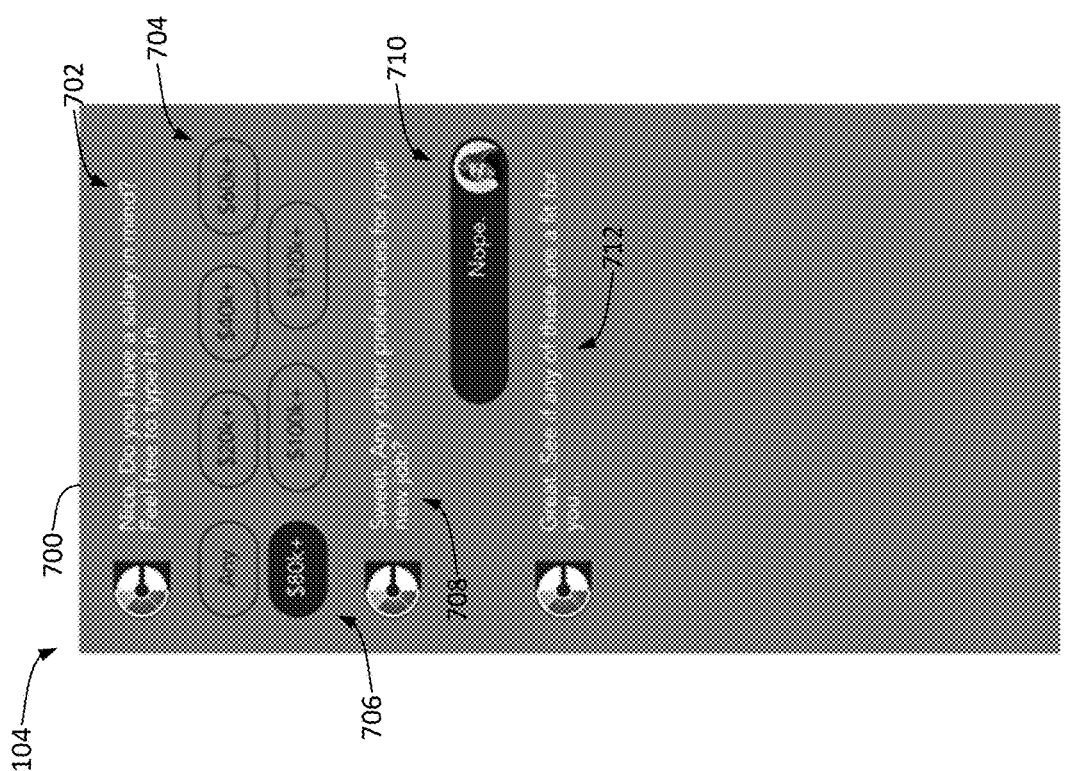
FIG. 7 illustrates another example interface of the employment app presented to the candidate of FIG. 1.

FIG. 7 illustrates another example interface 700 of the employment app 104 that is presented to the candidate 102 by the app manager 132. As illustrated in FIG. 7, the interface 700 includes another prompt 702 (e.g., a fifth prompt) that prompts the candidate 102 to provide a preferred income level. The interface 700 also includes income-level buttons 704 (e.g., a third set of selectable buttons) that enable the candidate to identify a minimum income level of interest. In the illustrated example, the income-level buttons 704 include an "any" button, a "$20 k+" button, a "$40 k+" button, a "$60 k+" button, an "$80 k+" button, a "$100 k+" button, and a "$120 k+" button. The candidate 102 selects one of the income-level buttons 704 to provide employment preferences related to income level. In the illustrated example, the "$80 k+" button is selected indicating that the preferred income level of the candidate 102 is at least $80,000. For example, the interface 700 includes a selection 706 (e.g., a third selection) that identifies the selected income level preference of the income-level buttons 704 by highlighting the one of the income-level buttons 704 that have been selected by the candidate 102. In some examples, the income-level buttons 704 presented on the interface 700 are identified (e.g., by the app manager 132) based upon selection(s), response(s) and/or other input provided by the candidate 102. For example, the income-level buttons 704 correspond to salaries upon the candidate 102 identifying that he or she is interested in full-time employment and/or correspond to hourly rates upon the candidate 102 identifying that he or she is interested in part-time work. In other examples, the interface 700 enables the candidate 102 to provide (e.g., via text and/or audible instructions) an income level preference via the employment app 104 without displaying and facilitating selection of dedicated job-type buttons. While this example receives employment preferences related to job title, location, job type, salary, etc., one of ordinary skill in the art will understand that there are many other inputs related to a job seeker identifying a job of interest that the employment website entity 100 may collect from the candidate 102 via the employment app 104 and utilize to identify employment opportunities to present to the candidate 102.

The interface 700 of the illustrated example includes another prompt 708 (e.g., a sixth prompt) that prompts the candidate 102 to provide any additional employment preferences. The interface 700 also includes a response 710 (e.g., a third response) to the prompt 708. In the illustrated example, the response 710 indicates that the candidate 102 does not have any additional employment preferences upon which the interface 700 includes a notification (e.g., a third notification) informing the candidate 102 that the employment website entity 100 will present employment opportunities to the candidate 102 via the employment app 104.

Figure 8:
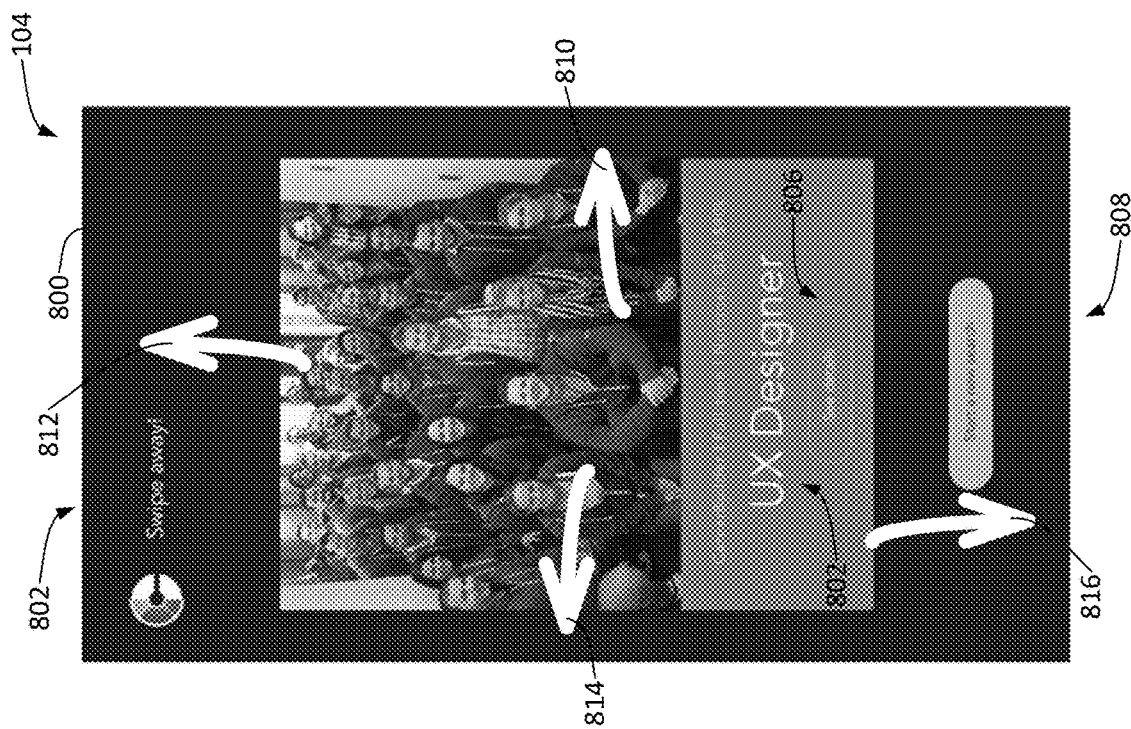
FIG. 8 illustrates another example interface of the employment app presented to the candidate of FIG. 1.

FIG. 8 illustrates another example interface 800 of the employment app 104 that is presented to the candidate 102 by the app manager 132. As illustrated in FIG. 8, the interface 800 includes instructions 802, employment opportunity information 804, a details button 806 and a new-search button 808.

The interface 800 of the illustrated example presents an employment opportunity to the candidate 102 and enables the candidate 102 to provide an instructions based upon and corresponding to the presented employment opportunity. That is, the interface presents the employment opportunity, receives instructions, and performs corresponding actions related to the presented employment opportunity in real time during the session of the candidate 102 on the employment app 104. The employment opportunity that is presented via the interface 800 is selected (e.g., via the app manager 132) based upon the previously collected candidate information (e.g., collected from the resume of the candidate 102) and/or employment preferences (e.g., collected via the interface 500 of FIG. 5, the interface 600 of FIG. 6 and/or the interface 700 of FIG. 7). In some examples, characteristics of the presented employment opportunity (e.g., employment title, location, employment type, income level, etc.) match all of the collected employment preferences of the candidate 102. In other examples, the characteristics of the presented employment opportunity (e.g., employment title, location, employment type, income level, etc.) match a portion of the collected employment preferences. Additionally or alternatively, some characteristics of the presented employment opportunity may be similar or approximate to the employment preferences of the candidate 102. For example, if the candidate 102 indicates that he or she is looks for employment opportunities in Chicago, IL, the presented employment opportunity may be located at a nearby location (e.g., Oak Park, IL). If the candidate 102 indicates that he or she is looks for employment opportunities with a salary of $60,000 or greater, the presented employment opportunity may offer a salary of $55,000.

The instructions 802 included in the interface 800 instruct the candidate 102 to perform one of a plurality of predefined input motions (e.g., "Swipe away!"). In some examples, the instructions 802 are selectable to provide additional instructions to the candidate 102 regarding the predefined input motions (e.g., identification of the motions and the corresponding actions performed). In some examples, the additional instructions are presented to the candidate 102 via the employment app 104 prior to presenting employment opportunities to the candidate 102. In the illustrated example, the interface 800 includes arrows sample to depict the predefined input motions. In other examples, the interface 800 may not include such depictions.

For example, the predefined input motions include a first predefined input motion 810, a second predefined input motion 812, a third predefined input motion 814, and a fourth predefined input motion 816. In the illustrated example, the first predefined input motion 810 is a single swipe motion in a first direction (e.g., a rightward direction), the second predefined input motion 812 is a single swipe motion in a second direction (e.g., an upward direction), the third predefined input motion 814 is a single swipe motion in a third direction (e.g., a leftward direction), and the fourth predefined input motion 816 is a single swipe motion in a fourth direction (e.g., a downward direction). The first predefined input motion 810 instructs the employment website entity 100 to automatically populate and submit an electronic application for the currently presented employment opportunity on behalf of the candidate 102, the second predefined input motion 812 instructs the employment website entity 100 to save the currently presented employment opportunity for the candidate 102, the third predefined input motion 814 instructs the employment website entity 100 to skip the presented employment opportunity, and the fourth predefined input motion 816 flags the presented employment opportunity as spam.

As illustrated in FIG. 8, the interface 800 includes the employment opportunity information 804 of the presented employment opportunity. In the illustrated example, the employment opportunity information 804 of the interface 800 includes a photograph or image (e.g., of current employees), an employment title (e.g., "UX Designer"), an employer (e.g., "CareerBuilder"), an employment type (e.g., "Full-time"), a location (e.g., "Norcross, GA"), and an income level (e.g., "$90 k). Additionally, the details button 806, upon being selected by the candidate 102, causes another interface of the employment app 104 (e.g., an interface 1000 of FIG. 10) that includes additional employment opportunity information (e.g., employment opportunity information 1002) to be presented to the candidate 102. Further, the new-search button 808, upon being selected by the candidate 102, causes a new search to be started (e.g., by returning to the interface 300 of FIG. 3).

Figure 9:
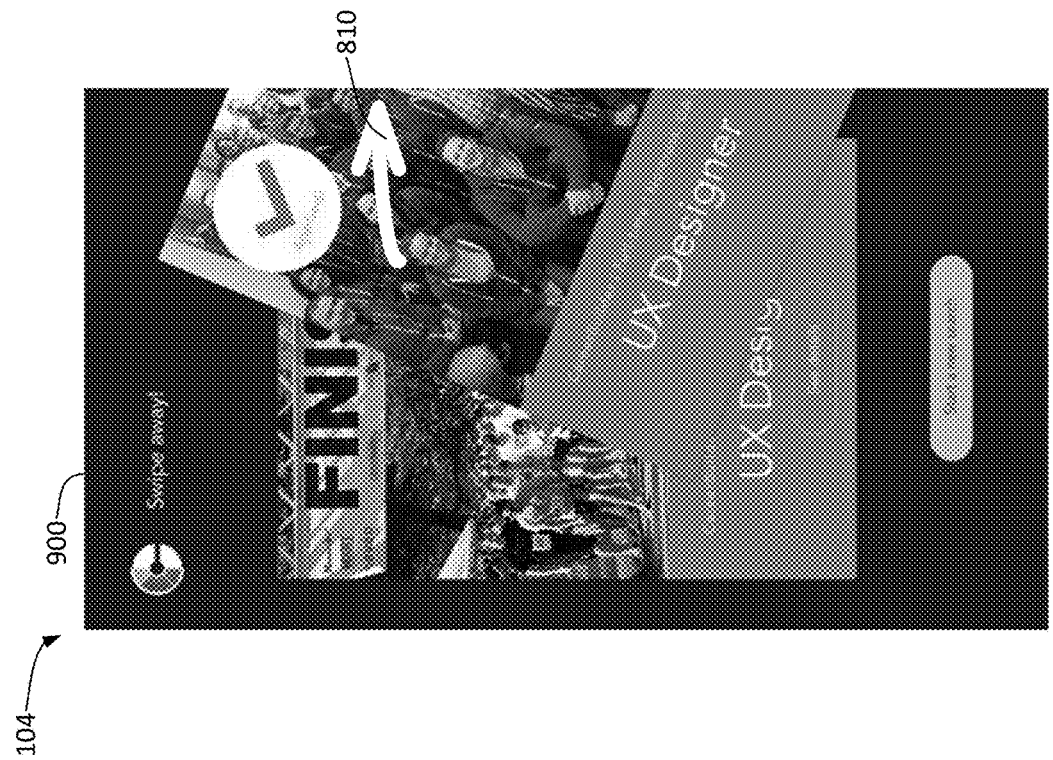
FIG. 9 illustrates another example interface of the employment app presented to the candidate of FIG. 1.

FIG. 9 illustrates another example interface 900 of the employment app 104 that is presented to the candidate 102 by the app manager 132. More specifically, the interface 900 of FIG. 9 illustrates the employment app 104 while the first predefined input motion 810 is being performed by the candidate 102. As the first predefined input motion 810 is being performed, one employment opportunity (e.g., a first employment opportunity) moves off the display 110 (e.g., in a direction of the first predefined input motion 810) to enable another employment opportunity (e.g., a second employment opportunity) to be presented.

Figure 10:
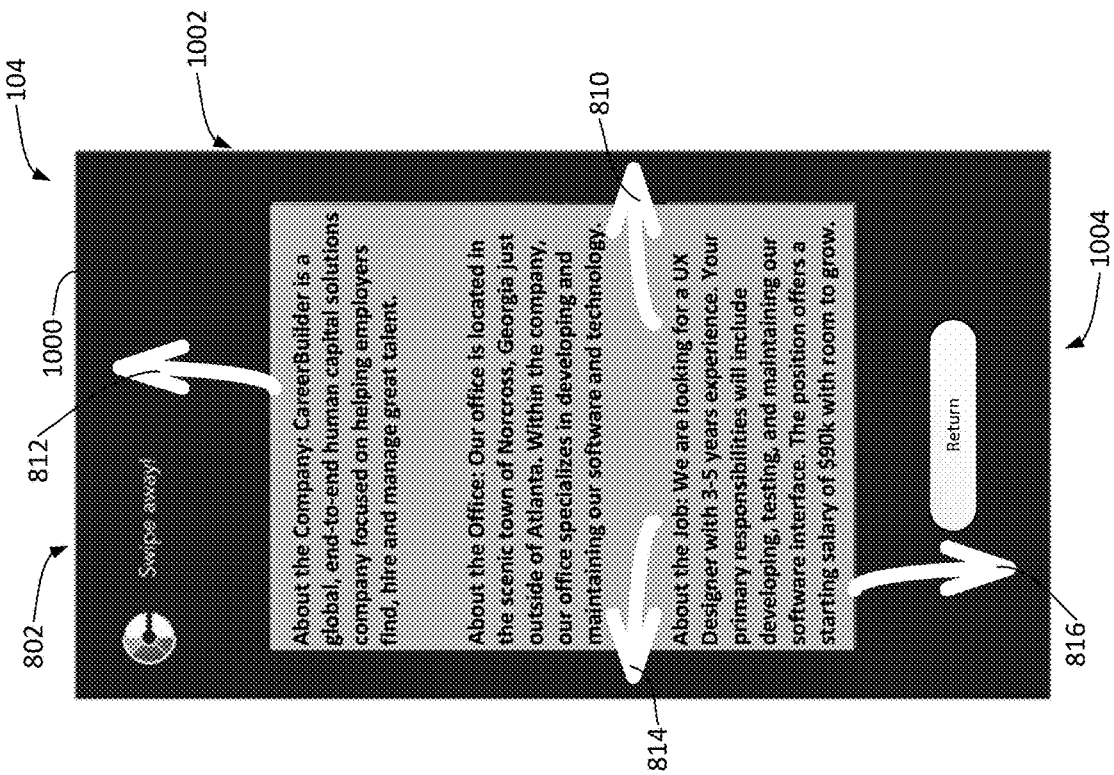
FIG. 10 illustrates another example interface of the employment app presented to the candidate of FIG. 1.

FIG. 10 illustrates another example interface 1000 of the employment app 104 that is presented to the candidate 102 by the app manager 132. The interface 1000 is presented upon the candidate 102 selecting the new-search button 808 of FIG. 8. As illustrated in FIG. 10, the interface 1000 includes additional employment opportunity information 1002 regarding the employment opportunity presented via the interface 800. Further, the interface 1000 includes a return button 1004 that causes the employment app 104 to return to the interface 800 upon being selected by the candidate 102. In the illustrated example, the first predefined input motion 810, the second predefined input motion 812, the third predefined input motion 814, and/or the fourth predefined input motion 816 may be performed by the candidate 102 while the interface 1000 is presented. Additionally or alternatively, the candidate 102 may select the return button 1004 to return to the interface 800 prior to performing the first predefined input motion 810, the second predefined input motion 812, the third predefined input motion 814, or the fourth predefined input motion 816 for the presented employment opportunity.

Figure 11A:
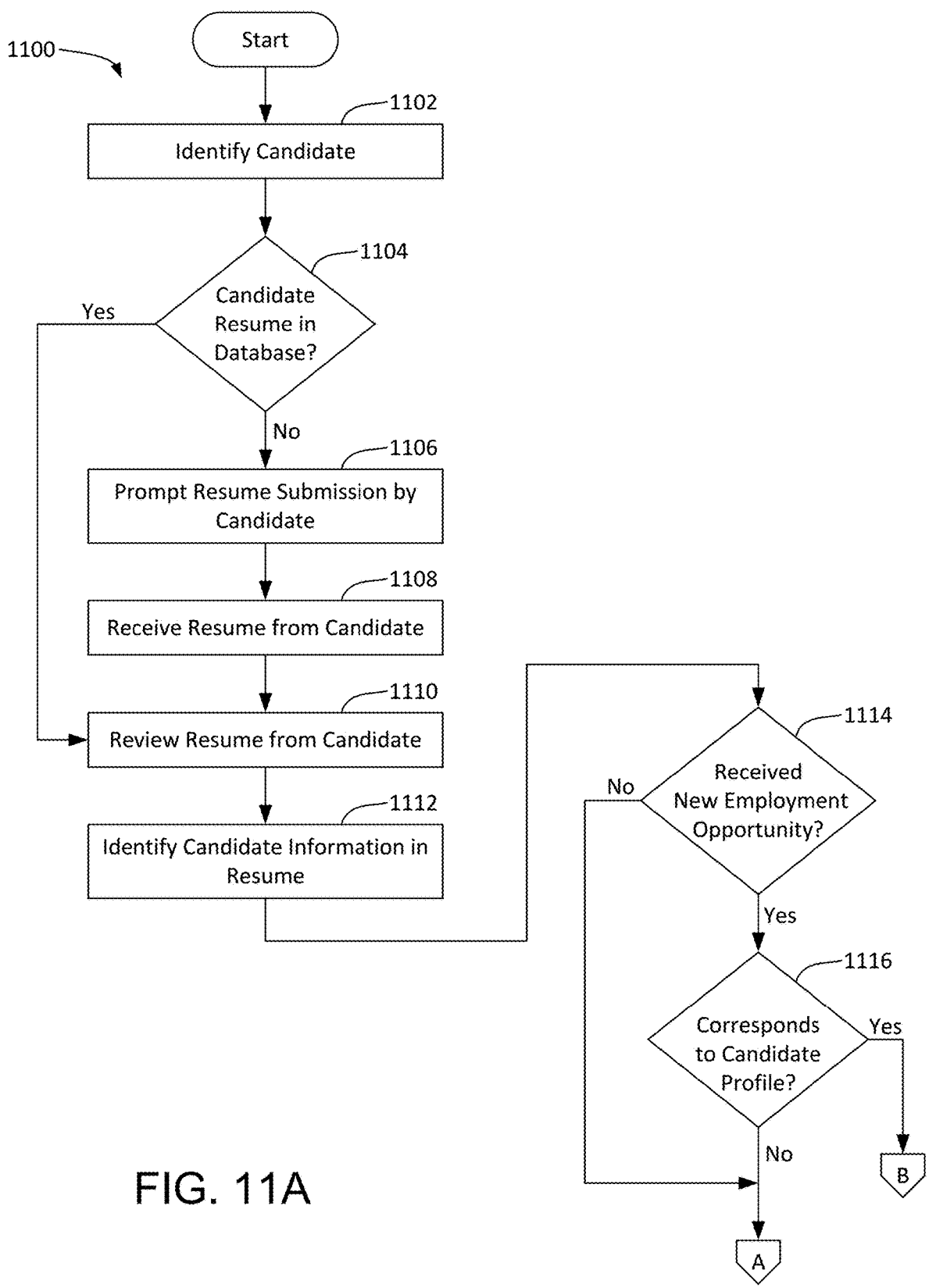
FIGS. 11A and 11B are flowcharts of an example method to present an employment opportunity to a candidate in accordance with the teachings herein.
Figure 11B:
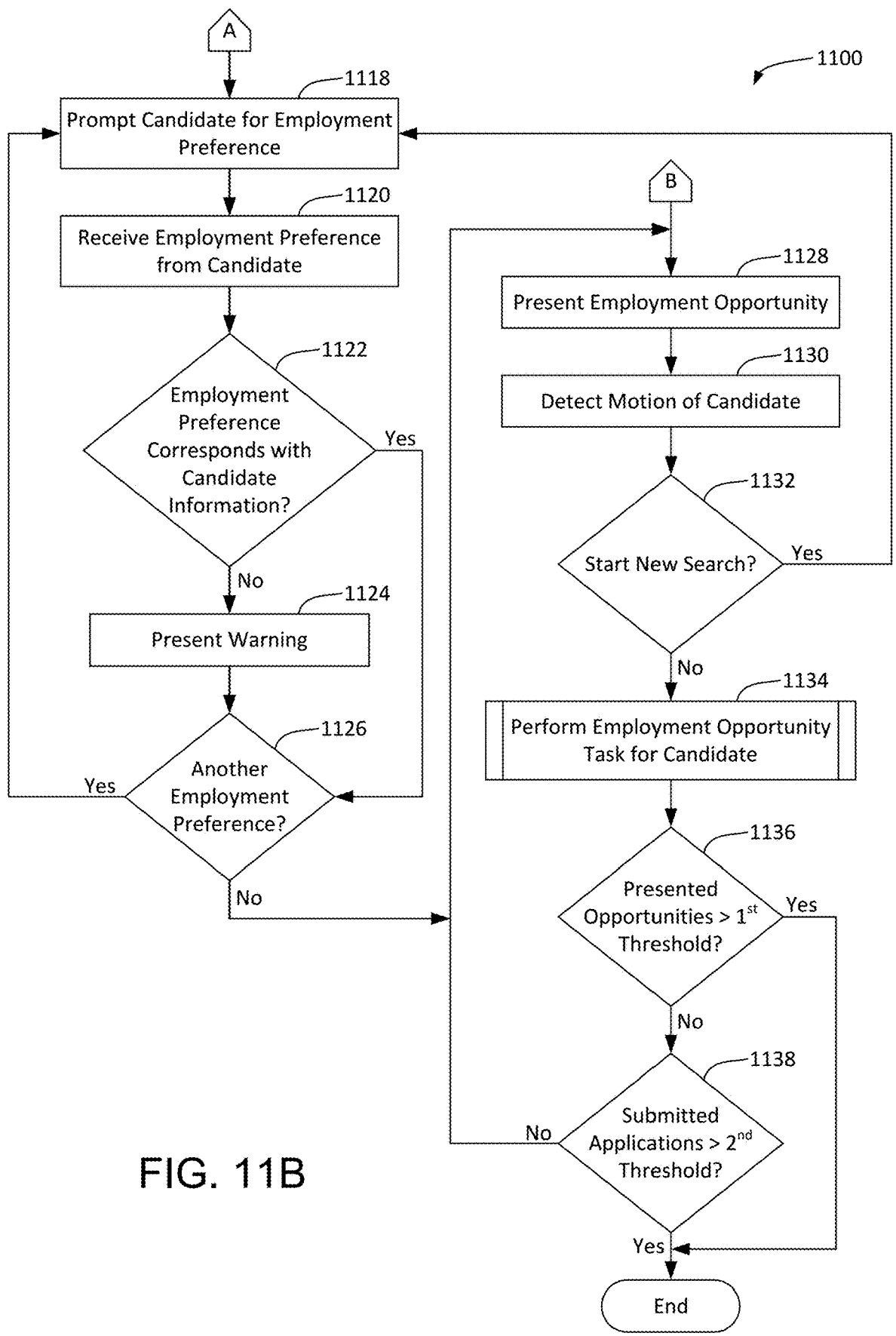

FIGS. 11A and 11B is a flowchart of an example method 1100 to present an employment opportunity to a candidate. The flowchart of FIGS. 11A and 11B is representative of machine readable instructions that are stored in memory (such as the memory 204 of FIG. 2) and include one or more programs which, when executed by a processor (such as the processor 202 of FIG. 2), cause the employment website entity 100 to implement the example employer manager 128, the example app manager 132, the example employment opportunity selector 136, and/or the example application populator 138 of FIGS. 1 and 2. While the example program is described with reference to the flowchart illustrated in FIGS. 11A and 11B, many other methods of implementing the example employer manager 128, the example app manager 132, the example employment opportunity selector 136, and/or the example application populator 138 may alternatively be used. For example, the order of execution of the blocks may be rearranged, changed, eliminated, and/or combined to perform the method 1100. Further, because the method 1100 is disclosed in connection with the components of FIGS. 1-10, some functions of those components will not be described in detail below.

Initially, at block 1102 of FIG. 11A, the app manager 132 identifies the candidate 102 utilizing the employment app 104. For example, the app manager 132 identifies the candidate 102 based upon a username, an email, and/or a name designated for the candidate 102. In some examples, the app manager 132 identifies the candidate 102 upon determining that the username, email and/or name entered by the candidate 102 in the username textbox 302 of the interface 300 of the employment app 104 matches and/or otherwise corresponds with a username, email and/or name stored in the candidate database 134 that corresponds to the candidate 102.

At block 1104, the app manager 132 determines whether the candidate 102 has a resume stored in the candidate database 134 of the employment website entity 100. In response to determining that the candidate 102 does not have a resume stored in the candidate database 134, the method 1100 proceeds to block 1106 at which the app manager 132 prompts the candidate 102 to submit a resume through the employment app 104. At block 1108, the app manager 132 receives the resume that the candidate 102 submitted through the employment app 104 and stores the resume in the candidate database 134.

Upon determining that the candidate database 134 has the resume at block 1104 or upon receiving the resume at block 1108, the method 1100 proceeds to block 1110 at which the app manager 132 reviews the resume of the candidate 102 in real time during the session of the candidate 102 on the employment app 104. At block 1112, the app manager 132 identifies candidate information that is included in the resume of the candidate 102. For example, the app manager 132 identifies contact information, an education level, attended school(s), previous employment title(s), previous place(s) of employment, performed employment task(s), skill(s), license(s), certificate(s), membership(s), etc. of the candidate 102 from within his or her resume. In some examples, the app manager 132 transforms one or more words or phrases of the candidate information to facilitate utilization of the candidate information in the selection of employment opportunities to present to the candidate 102.

At block 1114, the app manager 132 determines whether the employer manager 128 has received new employment opportunity(s) from an employer (e.g., the employer 106). For example, the app manager 132 may determine whether the employer manager 128 has received a new employment opportunity while a session of the candidate 102 with the employment app 104 is underway and/or is not underway (e.g., before and/or after a session). In response to the app manager 132 determining that the employer manager 128 has not received a new employment opportunity, the method 1100 proceeds to block 1118 of FIG. 11B. Otherwise, in response to the app manager 132 determining that the employer manager 128 has received a new employment opportunity, the method 1100 proceeds to block 1116 of FIG. 11A.

At block 1116, the app manager 132 determines whether the new employment opportunity corresponds to the candidate profile (e.g., including the candidate information and/or the search history). For example, the app manager 132 compares the new employment opportunity and the candidate profile to identify whether the candidate 102 would be interested in the new employment opportunity and/or whether the employer of the new employment opportunity would be interested in the candidate 102. In response to the app manager 132 determining that the new employment opportunity corresponds to the candidate profile, the method 1100 proceeds to block 1128 of FIG. 11B (at which the new employment opportunity is presented to the candidate 102. That is, the app manager 132 presents a new employment opportunity to the candidate 102 via the employment app 104 if the characteristics of the new employment opportunity match the candidate profile of the candidate 102. Otherwise, in response to the app manager 132 determining that the new employment opportunity does not correspond to the candidate profile, the method 1100 proceeds to block 1118 of FIG. 1B.

At block 1118, the app manager 132 prompts the candidate 102 to provide an employment preference (e.g., a first employment preference) via an interface (e.g., the interface 500 of FIG. 5, the interface 600 of FIG. 6, the interface 700 of FIG. 7) in real time during the session of the candidate 102 on the employment app 104. For example, the employment preference includes an employment title, a region or location of employment, an employment type, an income level, etc. At block 1120, the app manager 132 receives the employment preference from the candidate 102 via the employment app 104 in real time during his or her session on the employment app 104. The app manager 132 receives the employment preference via a selection of button(s) (e.g., physical buttons, buttons presented via a touch screen) and/or audible instruction(s) (e.g., received via a microphone and identified via speech-recognition software) provided by the candidate 102.

In some examples, the app manager 132 prompting the candidate 102 at block 1118 includes the app manager 132 identifying preselected employment characteristics based upon the candidate information of the resume and/or other information of the candidate profile of the candidate 102. The app manager 132 presents the preselected employment characteristics to the candidate 102 as button(s) (e.g., the job-title buttons 506 of FIG. 5, the job-type buttons 612 of FIG. 6, the income-level buttons 704 of FIG. 7) via the display 110. In such examples, the app manager 132 receives the employment preference(s) at block 1120 via a selection (e.g., the selection 508 of FIG. 5, the selection 614 of FIG. 6, the selection 706 of FIG. 7) of one or more of the buttons. Additionally or alternatively, the app manager 132 receives the employment preference(s) at block 1120 via a response (e.g., the response 604 of FIG. 6, the response 608 of FIG. 6) to a prompt (e.g., the prompt 602 of FIG. 6, the prompt 606 of FIG. 6) presented at block 1118. In some such examples, the app manager 132 transforms the employment preference of the response to facilitate selection of employment opportunities that are to be presented to the candidate 102.

At block 1122, the app manager 132 determines whether one or more of the employment preference(s) received at block 1120 correspond to the candidate information of the resume of the candidate 102. For example, the app manager 132 determines whether the employment preference(s) correspond to the candidate information upon comparing the employment preference(s) and the candidate information. In response to the app manager 132 determining that one or more of the employment preference(s) do not correspond to the candidate information, the method 1100 proceeds to block 1124 at which the app manager 132 presents a warning to the candidate 102 indicating that the provided employment preference(s) do not correspond to the qualifications of the candidate 102. In some examples, the employment app 104 may prevent the provided employment preference(s) that do not correspond to the qualifications of the candidate 102 from affecting which employment opportunities will be presented to the candidate 102. Upon the app manager 132 presenting the warning at block 1124 or determining at block 1122 that one or more of the employment preference(s) do not correspond with the candidate information, the method 1100 proceeds to block 1126.

At block 1126, the app manager 132 determines whether there is another employment preference to collect from the candidate 102. In response to determining that there is another employment preference to collect, the method 1100 returns to block 1118. For example, the method 1100 returns to block 1118 to enable the app manager 132 to prompt the candidate 102 to provide a second employment preference and to receive the second employment preference from the candidate 102. Otherwise, in response to determining that there is not another employment preference to collect, the method 1100 proceeds to block 1128.

At block 1128, the app manager 132 presents an employment opportunity (e.g., a first employment opportunity) to the candidate 102 via the employment app 104. In some examples, upon the app manager 132 determining at block 1126 that there is no other employment preference to receive, the employment opportunity selector 136 selects and retrieves the employment opportunity from the candidate database 134 in real time during the session of the candidate 102. For example, the employment opportunity selector 136 selects the employment opportunity from the entries stored in the candidate database 134 based upon the candidate information and/or the employment preference(s) previously collected from the candidate 102.

In some examples, the employment opportunity selector 136 selects an employment opportunity whose characteristics (e.g., employment title, location, employment type, income level, etc.) match all of those of the employment preferences of the candidate 102 collected by the app manager 132. In other examples, the employment opportunity selector 136 selects an employment opportunity whose characteristics match some (e.g., a portion) of those of the employment preferences of the candidate 102. Additionally or alternatively, the employment opportunity selector 136 selects an employment opportunity whose characteristics are similar or approximate to those of the employment preferences of the candidate 102.

Further, in some examples, upon the app manager 132 determining at block 1116 that the characteristics of a new employment opportunity corresponds to the candidate profile of the candidate 102, the employment opportunity selector 136 presents the new employment opportunity to the candidate 102 (e.g., during an ongoing session or upon initiating a new session of the candidate 102 with the employment app 104). In other examples in which the app manager 132 determines that the new employment opportunity corresponds to the candidate profile of the candidate 102, the app manager 132 may present an alert alerting the candidate 102 to the new employment opportunity.

At block 1130, the app manager 132 detects an employment command from the candidate 102 during his or her session on the employment app 104. For example, the app manager 132 detects a predefined input motion such as the first predefined input motion 810, the second predefined input motion 812, the third predefined input motion 814, the fourth predefined input motion 816 that the candidate 102 and/or a selection of the new-search button 808 that the candidate 102 provides through the employment app 104 via a touch screen (e.g., the display 110) of the mobile device 108. Additionally or alternatively, the app manager 132 may detect an employment command that is provided by the candidate 102 via audible instructions (e.g., a voice command received via a microphone and analyzed via speech-recognition software). For example, the candidate 102 provides and the app manager 132 receives audible instructions to a first predefined input command "apply," a second predefined input command to "save," a third predefined input command to "skip," and/or a fourth predefined input command to "flag."

At block 1132, the app manager 132 determines whether to start a new search for the candidate 102. For example, the app manager 132 determines to start a new search upon detecting that the employment command provided by the candidate 102 corresponds to a selection of the new-search button 808. In response to the app manager 132 determining to start a new search, the method 1100 returns to block 1118. Otherwise, in response to the app manager 132 determining not to start a new search, the method 1100 proceeds to block 1134.

At block 1134, the processor 202 of the employment website entity 100 performs an employment opportunity task for the candidate 102 based upon the employment command detected at block 1130. For example, as disclosed in further detail below with respect to FIG. 12, the application populator 138 may populate and the employer manager 128 may submit an application for the candidate 102, the app manager 132 may save the employment opportunity for the candidate 102, the app manager 132 may skip and the employment opportunity selector 136 may record or log the skipping of the employment opportunity for the candidate 102, and/or the employment opportunity selector 136 may document the employment opportunity as spam at block 1134.

At block 1136, upon performing the employment opportunity task, the app manager 132 determines whether the number of employment opportunities presented during a first time period (e.g., 5 minutes, 15 minutes, 1 hour, 12 hours, 1 day, 3 days, 1 week, etc.) is greater than a first threshold. In response to the app manager 132 determining that the number of presented employment opportunities is greater than the first threshold, the method 1100 ends to limit the number of employment opportunities presented to the candidate 102 during the first predetermined time period. That is, the app manager 132 monitors the number of employment opportunities presented to the candidate 102 during the first predetermined time period and stops presenting employment opportunities to the candidate 102 for a second predetermined time period (e.g., 5 minutes, 15 minutes, 1 hour, 12 hours, 1 day, etc.) upon determining that the number of presented employment opportunities exceeds the first threshold. Otherwise, in response to the app manager 132 determining that the number of presented employment opportunities is less than or equal to the first threshold, the method 1100 proceeds to block 1138.

At block 1138, the app manager 132 determines whether the number of applications submitted for the candidate 102 during a third time period (e.g., 5 minutes, 15 minutes, 1 hour, 12 hours, 1 day, 3 days, 1 week, etc.) is greater than a third threshold. In response to the app manager 132 determining that the number of submitted applications is greater than the second threshold, the method 1100 ends to limit the number of applications presented to and/or submitted for the candidate 102 during the third predetermined time period. That is, the app manager 132 monitors the number of applications submitted for the candidate 102 during the third predetermined time period and stops the employer manager 128 from submitting applications on behalf of and/or stops presenting employment opportunities to the candidate 102 for a fourth predetermined time period (e.g., 5 minutes, 15 minutes, 1 hour, 12 hours, 1 day, etc.) upon determining that the number of submitted applications exceeds the second threshold. Otherwise, in response to the app manager 132 determining that the number of submitted applications is less than or equal to the second threshold, the method 1100 returns to block 1128 to present another employment opportunity. That is, the method 1100 returns to block 1128 to enable the app manager 132 to present another employment opportunity (e.g., a second employment opportunity) upon receiving the employment command for the first employment opportunity presented to the candidate 102.

Figure 12:
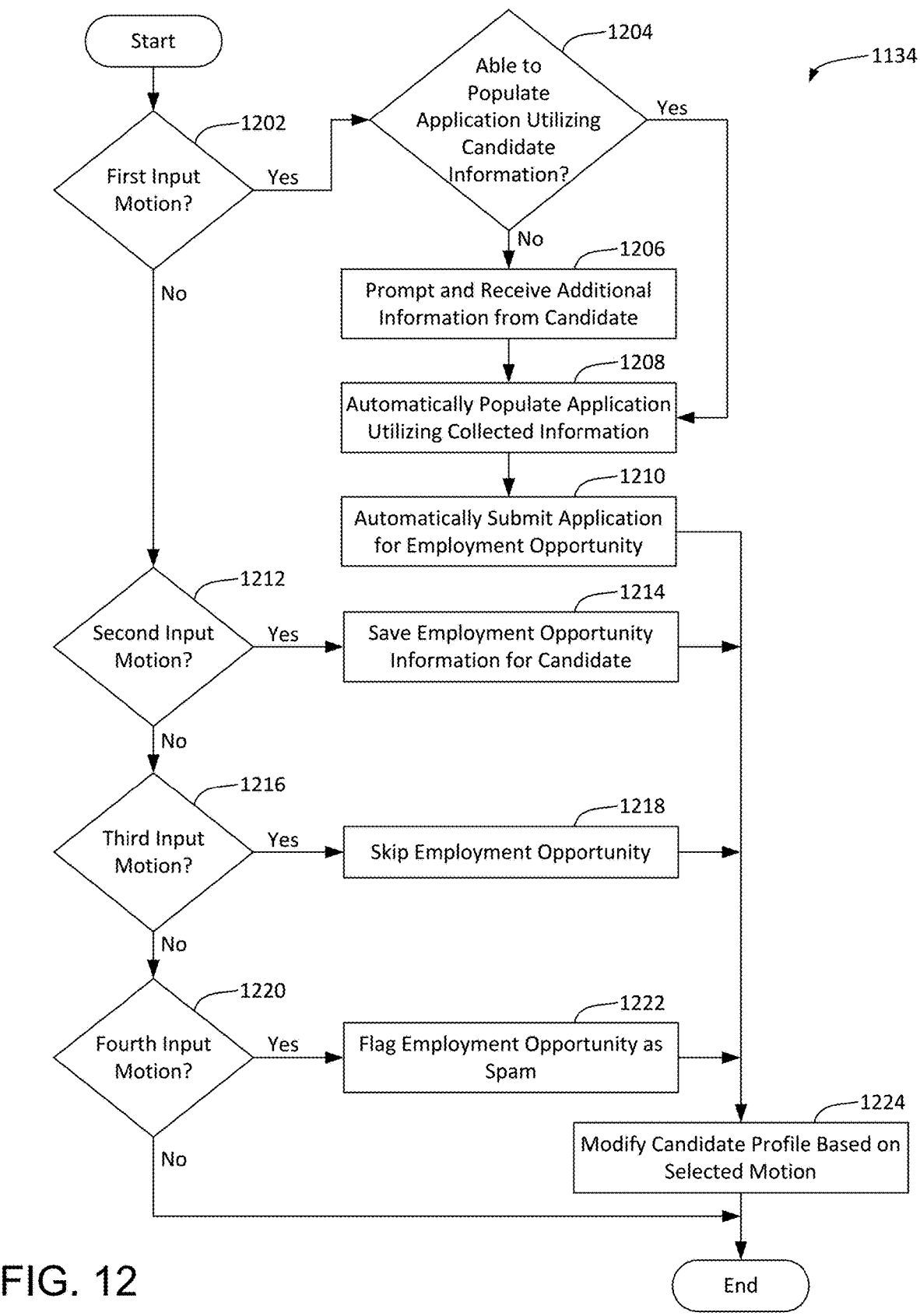
FIG. 12 is a flowchart to perform an employment opportunity task for the candidate of FIG. 11.

FIG. 12 is a flowchart of an example method 1134 to perform the block 1134 of FIG. 11B to perform an employment opportunity task for a candidate. The flowchart of FIG. 12 is representative of machine readable instructions that are stored in memory (such as the memory 204 of FIG. 2) and include one or more programs which, when executed by a processor (such as the processor 202 of FIG. 2), cause the employment website entity 100 to implement the example employer manager 128, the example app manager 132, and/or the example application populator 138 of FIGS. 1 and 2. While the example program is described with reference to the flowchart illustrated in FIG. 12, many other methods of implementing the example employer manager 128, the example app manager 132, and/or the example application populator 138 may alternatively be used. For example, the order of execution of the blocks may be rearranged, changed, eliminated, and/or combined to perform the method 1134. Further, because the method 1134 is disclosed in connection with the components of FIGS. 1-10, some functions of those components will not be described in detail below.

Initially, at block 1202, the app manager 132 determines whether the employment command is the first predefined input motion 810. For example, the first predefined input motion 810 is a first swipe motion across an input screen (e.g., the display 110 of the mobile device 108) in a first direction (e.g., a rightward direction). In response to the app manager 132 determining that the employment command is the first predefined input motion 810, the method 1134 proceeds to block 1204. At block 1204, the application populator 138 is to determine whether the entire application is able to be populated on behalf of the candidate 102 based upon the candidate information from the resume of the candidate 102. That is, the application populator 138 determines whether the candidate information of the resume includes all of the requested information for the application.

In response to the application populator 138 determining that the entire application is unable to be populated utilizing only the candidate information, the method 1134 proceeds to block 1206. At block 1206, the app manager 132 prompts for and receives additional information from the candidate 102 that enables the application populator 138 to populate the application on behalf of the candidate 102. Upon the app manager 132 receiving the additional information, the method 1134 proceeds to block 1208. Otherwise, in response to the application populator 138 determining that the application is able to be populated utilizing only the candidate information, the method also proceeds to block 1208.

At block 1208, the application populator 138 automatically populates, in real time during the session of the candidate 102 on the employment app 104, an electronic application for the presented employment opportunity (e.g., the first presented employment opportunity) utilizing the candidate information and/or any other information previously provided by the candidate 102. For example, the application populator 138 receives an application for the presented employment opportunity (e.g., via the employer manager 128 and/or the app manager 132), identifies information requested in the application, identifies candidate information included in the resume of the candidate 102 that corresponds to the requested information, and populates a completed application for the candidate 102 utilizing his or her candidate information. For example, an application for one employment opportunity may request different information compared to an application for another employment opportunity. The application populator 138 populates the different applications by identifying the requested information for each of the applications and identifying the candidate information of the candidate 102 that correspond to each of the applications. Thus, the application populator 138 enables the candidate 102 to quickly populate (and subsequently file) different applications for different employment opportunities. At block 1210, the employer manager 128 automatically submits the populated electronic application of the candidate 102 to the employer 106 for the employment opportunity.

Otherwise, in response to the app manager 132 determining at block 1202 that the employment command is not the first predefined input motion 810, the method 1134 proceeds to block 1212 at which the app manager 132 determines whether the employment command is the second predefined input motion 812. For example, the second predefined input motion 812 is a second swipe motion across the input screen (e.g., the display 110) in a second direction (e.g., an upward direction). In response to the app manager 132 determining that the employment command is the second predefined input motion 812, the method 1134 proceeds to block 1214 at which the app manager 132 saves the employment opportunity in the candidate database 134 for the candidate 102. For example, the app manager 132 stores information corresponding to the employment opportunity and the candidate 102 in the candidate database 134 to enable the candidate 102 to enable the candidate 102 to access the application at a later time for subsequent population and submission to the employer 106. Otherwise, in response to the app manager 132 determining at block 1212 that the employment command is not the second predefined input motion 812, the method 1134 proceeds to block 1216.

At block 1216, the app manager 132 determines whether the employment command is the third predefined input motion 814. For example, the third predefined input motion 814 is a third swipe motion across the input screen (e.g., the display 110) in a third direction (e.g., a leftward direction).

In response to the app manager 132 determining that the employment command is the third predefined input motion 814, the method 1134 proceeds to block 1218 at which the app manager 132 skips the employment opportunity for the candidate 102. For example, the app manager 132 skips the employment opportunity by causing an application for the employment opportunity to not be populated or submitted for the candidate 102. In some examples, the employment opportunity selector 136 records or logs in the job database 130 that the employment opportunity has been skipped by the candidate 102 to delay or prevent the employment opportunity from being presented to the candidate 102 again at a later time. Otherwise, in response to the app manager 132 determining at block 1216 that the employment command is not the third predefined input motion 814, the method 1134 proceeds to block 1220.

At block 1220, the app manager 132 determines whether the employment command is the fourth predefined input motion 816. For example, the fourth predefined input motion 816 is a fourth swipe motion across the input screen (e.g., the display 110) in a fourth direction (e.g., a downward direction). In response to the app manager 132 determining that the employment command is the fourth predefined input motion 816, the method 1134 proceeds to block 1222 at which the app manager 132 flags the employment opportunity as spam. For example, the app manager 132 instructs the employment opportunity selector to remove the employment opportunity flagged as spam from the job database 130. The employment opportunity selector 136 removes the employment opportunity from the job database 130 upon receiving a predetermined number of instructions from the app manager 132 to do so. That is, the employment opportunity selector 136 removes the employment opportunity from the job database 130 after the employment has been flagged as spam a predetermined number of times by candidates (e.g., the candidate 102) utilizing the employment app 104. Otherwise, in response to the app manager 132 determining at block 1216 that the employment command is not the fourth predefined input motion 816, the method 1134 ends.

Further, upon block 1210, block 1214, block 1218, or block 1222 being executed, the method 1134 proceeds to block 1224 at which the app manager 132 modifies the candidate profile (e.g., including a search history, employment search parameters, etc.) that are utilized by the employment opportunity selector 136 to identify employment opportunities for presentation to the candidate 102 via an employment app 104. The app manager 132 modifies the employment search parameters for later searches to cause the employment opportunity selector 136 to subsequently present more or less employment opportunities that have shared characteristics with the presented employment opportunity based upon the employment command provided by the candidate 102. For example, the app manager 132 utilizes machine learning algorithms (e.g., linear regressions, decision trees, neural networks, support vector machines, clustering, Bayesian networks, nearest neighbors, K-means, etc.) that analyze the search history of the candidate 102 to develop employment search parameters for the candidate 102 that consistently identify employment opportunities for which the candidate 102 is qualified and interested. When the candidate 102 has instructed the employer manager 128 to submit an application for the presented employment opportunity, the app manager 132 causes the employment opportunity selector 136 to select more employment opportunities that have shared characteristics with the presented employment opportunity. When the candidate 102 has instructed the app manager 132 to skip the employment opportunity, the app manager 132 causes the employment opportunity selector 136 to select less employment opportunities that have shared characteristics with the presented employment opportunity. Upon executing block 1224, the method 1134 ends.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system for presenting employment opportunities and submitting applications, the system comprising:
    a database configured to store employment preferences of a candidate and candidate information associated with a resume of the candidate; and
    one or more processors configured to:
        retrieve, in real time during a session of the candidate on an employment app operating on a computing device, a first employment opportunity for the candidate based upon the candidate information and the employment preferences of the candidate;
        detect, during the session, an employment command received from the candidate via the computing device in response to presenting the first employment opportunity to the candidate via the computing device;
        in response to determining that the employment command is a first predefined single swipe motion across a touchscreen of the computing device:
            automatically populate an electronic application for the first employment opportunity utilizing the candidate information;
            automatically submit the electronic application to an employer corresponding to the first employment opportunity; and
            present a second employment opportunity via the computing device.

2. The system of claim 1, wherein the one or more processors are configured to identify the candidate information from the resume of the candidate, wherein the candidate information includes at least one of an education level, an employment title, or an employment task.

3. The system of claim 1, wherein the one or more processors are configured to receive the employment preferences from the candidate upon presenting at least one of a prompt or preselected employment characteristics to the candidate via the computing device.

4. The system of claim 1, wherein the first predefined single swipe motion is a swipe motion across the touchscreen in a first direction.

5. The system of claim 4, wherein the one or more processors are configured to save the second employment opportunity in the database for subsequent access by the candidate in response to determining that the employment command is a second predefined single swipe motion, wherein the second predefined single swipe motion is a single swipe motion across the touchscreen in a second direction.

6. The system of claim 4, wherein the one or more processors are configured to skip the second employment opportunity without populating or submitting the electronic application for the candidate for the first employment opportunity in response to determining that the employment command is a third predefined single swipe motion, wherein the third predefined single swipe motion is a single swipe motion across the touchscreen in a third direction.

7. The system of claim 4, wherein the one or more processors are configured to flag the second employment opportunity as spam in response to determining that the employment command is a fourth predefined single swipe motion, wherein the fourth predefined single swipe motion is a single swipe motion across the touchscreen in a fourth direction.

8. A method for presenting employment opportunities and submitting applications, the method comprising:
    storing, via a database, employment preferences of a candidate and candidate information associated with a resume of the candidate;
    retrieving, in real time during a session of the candidate on an employment app operating on a computing device, a first employment opportunity for the candidate based upon the candidate information and the employment preferences of the candidate;
    detecting, during the session, an employment command received from the candidate via the computing device in response to presenting the first employment opportunity to the candidate via the computing device;
    in response to determining that the employment command is a first predefined single swipe motion across a touchscreen of the computing device:
        automatically populating an electronic application for the first employment opportunity utilizing the candidate information;
        automatically submitting the electronic application to an employer corresponding to the first employment opportunity; and
        presenting a second employment opportunity via the computing device.

9. The method of claim 8, further comprising identifying the candidate information from the resume of the candidate, wherein the candidate information includes at least one of an education level, an employment title, or an employment task.

10. The method of claim 8, wherein the first predefined single swipe motion is a swipe motion across the touchscreen of the computing device in a first direction.

11. The method of claim 10, further comprising saving, during the session, the second employment opportunity in the database for subsequent access by the candidate in response to determining that the employment command is a second predefined single swipe motion, wherein the second predefined single swipe motion is a single swipe motion across the touchscreen in a second direction.

12. The method of claim 10, further comprising skipping, during the session, the second employment opportunity without populating or submitting the electronic application for the candidate for the first employment opportunity in response to determining that the employment command is a third predefined single swipe motion, wherein the third predefined single swipe motion is a single swipe motion across the touchscreen in a third direction.

13. The method of claim 10, further comprising flagging, during the session, the second employment opportunity as spam in response to determining that the employment command is a fourth predefined single swipe motion, wherein the fourth predefined single swipe motion is a single swipe motion across the touchscreen in a fourth direction.

14. A tangible computer readable medium including instructions which, when executed, cause a machine to:
    store employment preferences of a candidate and candidate information associated with a resume of the candidate;
    retrieve, in real time during a session of the candidate on an employment app operating on a computing device, a first employment opportunity for the candidate based upon the candidate information and the employment preferences of the candidate;
    detect, during the session, an employment command received from the candidate via the computing device in response to presenting the first employment opportunity to the candidate via the computing device;
    in response to determining that the employment command is a first predefined single swipe motion across a touchscreen of the computing device:
        automatically populate an electronic application for the first employment opportunity utilizing the candidate information;
        automatically submit the electronic application to an employer corresponding to the first employment opportunity; and
        present a second employment opportunity via the computing device.

15. The tangible computer readable medium of claim 14, wherein the instructions which, when executed, further cause the machine to identify the candidate information from the resume of the candidate, wherein the candidate information includes at least one of an education level, an employment title, or an employment task.

16. The tangible computer readable medium of claim 14, wherein the instructions which, when executed, further cause the machine to receive the employment preferences from the candidate upon presenting at least one of a prompt or preselected employment characteristics to the candidate via the computing device.

17. The tangible computer readable medium of claim 14, wherein the first predefined single swipe motion is a swipe motion across the touchscreen in a first direction.

18. The tangible computer readable medium of claim 17, wherein the instructions which, when executed, further cause the machine to save the second employment opportunity for subsequent access by the candidate in response to determining that the employment command is a second predefined single swipe motion, wherein the second predefined single swipe motion is a single swipe motion across the touchscreen in a second direction.

19. The tangible computer readable medium of claim 17, wherein the instructions which, when executed, further cause the machine to skip the second employment opportunity without populating or submitting the electronic application for the candidate for the first employment opportunity in response to determining that the employment command is a third predefined single swipe motion, wherein the third predefined single swipe motion is a single swipe motion across the touchscreen in a third direction.

20. The tangible computer readable medium of claim 17, wherein the instructions which, when executed, further cause the machine to flag the second employment opportunity as spam in response to determining that the employment command is a fourth predefined single swipe motion, wherein the fourth predefined single swipe motion is a single swipe motion across the touchscreen in a fourth direction.

* * * * *

UNITED STATES PATENT AND TRADEMARK OFFICE
CERTIFICATE OF CORRECTION

PATENT NO. : 12,026,677 B2  
APPLICATION NO. : 18/478442  
DATED : July 2, 2024  
INVENTOR(S) : Khalifeh Al Jadda et al.

Page 1 of 1

It is certified that error appears in the above-identified patent and that said Letters Patent is hereby corrected as shown below:

In the Claims

Column 26, Line 5, Claim 5, "the second employment" should be changed to --the first employment--.

Column 26, Line 13, Claim 6, "the second employment" should be changed to --the first employment--.

Column 26, Line 21, Claim 7, "the second employment" should be changed to --the first employment--.

Column 26, Line 68, Claim 12, "the second employment" should be changed to --the first employment--.

Column 27, Line 6, Claim 13, "the second employment" should be changed to --the first employment--.

Column 28, Line 15, Claim 18, "the second employment" should be changed to --the first employment--.

Column 28, Line 23, Claim 19, "the second employment" should be changed to --the first employment--.

Column 28, Line 32, Claim 20, "the second employment" should be changed to --the first employment--.

Signed and Sealed this  
Twenty-seventh Day of August, 2024

Katherine Kelly Vidal  
*Director of the United States Patent and Trademark Office*